US 6,600,631 B1

(12) United States Patent
Berding et al.

(10) Patent No.: US 6,600,631 B1
(45) Date of Patent: *Jul. 29, 2003

(54) TRANSDUCER/FLEXURE/CONDUCTOR STRUCTURE FOR ELECTROMAGNETIC READ/WRITE SYSTEM

(75) Inventors: Keith R. Berding, San Jose, CA (US); Michael A. Baldwinson, Cupertino, CA (US); Harold J. Hamilton, Santa Clara, CA (US); Timothy W. Martin, Los Altos, CA (US)

(73) Assignee: Censtor Corp., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/338,394

(22) Filed: Nov. 14, 1994

Related U.S. Application Data

(63) Continuation-in-part of application No. 08/191,967, filed on Feb. 4, 1994, now abandoned, which is a continuation-in-part of application No. 07/919,302, filed on Jul. 23, 1992, now abandoned, which is a continuation-in-part of application No. 07/806,611, filed on Dec. 12, 1991, now Pat. No. 5,174,012, which is a continuation of application No. 07/632,958, filed on Jul. 24, 1991, now Pat. No. 5,073,242, which is a continuation of application No. 07/441,716, filed on Nov. 27, 1989, now Pat. No. 5,041,932, application No. 08/338,394, which is a continuation-in-part of application No. 07/990,005, filed on Dec. 10, 1992, now abandoned, which is a continuation of application No. 07/746,916, filed on Aug. 19, 1991, now abandoned, application No. 08/338,394, which is a continuation-in-part of application No. 07/966,095, filed on Oct. 22, 1992, now Pat. No. 5,550,691, which is a continuation-in-part of application No. 07/783,509, filed on Oct. 28, 1991, now abandoned, application No. 08/338,394, which is a continuation-in-part of application No. 07/783,619, filed on Oct. 28, 1991, now Pat. No. 5,490,027, application No. 08/338,394, which is a continuation-in-part of application No. 08/179,758, filed on Jan. 7, 1994, now abandoned, which is a continuation of application No. 07/684,025, filed on Apr. 10, 1991, now abandoned, application No. 08/338,394, which is a continuation-in-part of application No. 08/017,984, filed on Feb. 12, 1993, now abandoned, which is a continuation of application No. 07/770,593, filed on Oct. 3, 1991, now abandoned, application No. 08/338,394, which is a continuation-in-part of application No. 08/180,540, filed on Jan. 12, 1994, now abandoned, which is a continuation-in-part of application No. 07/760,586, filed on Sep. 16, 1991, now abandoned.

(51) Int. Cl.$^7$ ................................................. G11B 5/48
(52) U.S. Cl. ................................................. 360/244.3
(58) Field of Search ............................... 360/104, 244.3

(56) References Cited

U.S. PATENT DOCUMENTS 2,769,037 A   10/1956   Dank et al. .............. 179/100.2

(List continued on next page.)

FOREIGN PATENT DOCUMENTS

EP    0583921 A1    2/1994

(List continued on next page.)

OTHER PUBLICATIONS

R.L. Wallace, Jr., "The Reproduction of Magnetically Recorded Signals," *The Bell System Technical Journal*, Oct. 1951.

(List continued on next page.)

*Primary Examiner*—Robert S. Tupper
(74) *Attorney, Agent, or Firm*—Kolisch Hartwell, P.C.

(57) ABSTRACT

Flexure/transducer structure employable in an electromagnetic information storage and retrieval system wherein mechanical load-bearing responsibilities and electrical-current-carrying responsibilities are merged into and shared by common structure. The invention subject matter is useable in systems characterized by contact operation, as well as by quasi-contact and noncontact operations, in relation to the recording surface in an information recording medium.

13 Claims, 23 Drawing Sheets

U.S. PATENT DOCUMENTS

| | | | | |
|---|---|---|---|---|
| 2,854,310 | A | 9/1958 | Rehorn | 346/74 |
| 2,931,691 | A | 4/1960 | Curtis et al. | 346/74 |
| 3,124,788 | A | 3/1964 | Ricketts et al. | 340/174.1 |
| 3,665,436 | A | 5/1972 | Murray et al. | 340/174.1 |
| 3,673,352 | A | 6/1972 | Wada et al. | 179/100.2 |
| 3,805,290 | A | 4/1974 | Thompson | 360/103 |
| 3,848,217 | A | 11/1974 | Lazzari | 338/32 |
| 3,879,760 | A | 4/1975 | Lazzari | 360/113 |
| 3,919,717 | A | 11/1975 | Cullen et al. | 360/122 |
| 3,956,769 | A | 5/1976 | Beecroft et al. | 360/77 |
| 3,975,771 | A | 8/1976 | Lazzari | 360/104 |
| 4,028,734 | A | 6/1977 | Mos | 360/104 |
| RE29,326 | E | 7/1977 | Lazzari et al. | 360/123 |
| 4,167,765 | A | 9/1979 | Watrous | 360/103 |
| 4,225,892 | A | 9/1980 | Bassett et al. | 360/113 |
| 4,245,267 | A | 1/1981 | Herman | 360/104 |
| 4,306,258 | A | 12/1981 | Higashiyama et al. | 360/99 |
| 4,317,147 | A | 2/1982 | Daughenbaugh et al. | 360/113 |
| 4,363,045 | A | 12/1982 | Herman | 360/104 |
| 4,418,472 | A | 12/1983 | Lorenze, Jr. | 29/603 |
| 4,422,115 | A | 12/1983 | Spash | 360/104 |
| 4,423,449 | A | 12/1983 | Hasegawa | 360/106 |
| 4,430,440 | A | 2/1984 | Wada et al. | 501/105 |
| 4,456,936 | A | 6/1984 | Steen et al. | 360/104 |
| 4,517,616 | A | 5/1985 | Bischoff | 360/126 |
| 4,549,238 | A | 10/1985 | Ertingshausen et al. | 360/103 |
| 4,558,385 | A | 12/1985 | Kaminaka et al. | 360/126 |
| 4,589,041 | A | 5/1986 | Voegeli | 360/113 |
| 4,604,670 | A | 8/1986 | Visser | 360/127 |
| 4,639,906 | A | 1/1987 | Goto | 369/14 |
| 4,703,375 | A | 10/1987 | Chan et al. | 360/105 |
| 4,703,383 | A | 10/1987 | Katou et al. | 360/126 |
| 4,716,478 | A | 12/1987 | Walsh et al. | 360/104 |
| 4,731,683 | A | 3/1988 | Otomo et al. | 360/119 |
| 4,734,802 | A | 3/1988 | Higuchi et al. | 360/104 |
| 4,739,431 | A | 4/1988 | Yasuda et al. | 360/126 |
| 4,760,478 | A | 7/1988 | Pal et al. | 360/104 |
| 4,761,699 | A | 8/1988 | Ainslie et al. | 360/103 |
| 4,797,763 | A | 1/1989 | Levy et al. | 360/104 |
| 4,807,070 | A | 2/1989 | Isozaki et al. | 360/104 |
| 4,811,140 | A | 3/1989 | Enami et al. | 360/104 |
| 4,819,091 | A | 4/1989 | Brezoczky et al. | 360/97.01 |
| 4,819,094 | A | 4/1989 | Oberg | 360/104 |
| 4,829,395 | A | 5/1989 | Coon et al. | 360/104 |
| 4,833,556 | A | 5/1989 | Kosarko et al. | 360/102 |
| 4,853,811 | A | 8/1989 | Brooks, Jr. et al. | 360/103 |
| 4,855,854 | A | 8/1989 | Wada et al. | 360/126 |
| 4,858,043 | A | 8/1989 | Kadokura et al. | 360/99.01 |
| 4,860,139 | A | 8/1989 | Hamilton | 360/126 |
| 4,876,790 | A | 10/1989 | Grimm et al. | 29/603 |
| 4,878,140 | A | 10/1989 | Gill et al. | 360/113 |
| 4,885,650 | A | 12/1989 | Banka et al. | 360/122 |
| 4,897,747 | A | 1/1990 | Memler et al. | 360/122 |
| 4,937,693 | A | 6/1990 | Connolly et al. | 360/106 |
| 4,939,611 | A | 7/1990 | Connolly | 360/128 |
| 4,943,875 | A | 7/1990 | Reidenbach et al. | 360/104 |
| 4,949,194 | A | 8/1990 | MacPherson et al. | 360/104 |
| 4,949,207 | A | 8/1990 | Lazzari | 360/119 |
| 4,991,045 | A | 2/1991 | Oberg | 360/104 |
| 4,994,931 | A | 2/1991 | Foote | 360/106 |
| 4,996,616 | A | 2/1991 | Aoyagi et al. | 360/104 |
| 4,996,623 | A | 2/1991 | Erpelding et al. | 360/104 |
| 5,001,583 | A | 3/1991 | Matsuzaki | 360/104 |
| 5,006,946 | A | 4/1991 | Matsuzaki | 360/104 |
| 5,008,768 | A | 4/1991 | Carlson et al. | 360/104 |
| 5,014,146 | A | 5/1991 | Takatsuka et al. | 360/106 |
| 5,027,240 | A | 6/1991 | Zarouri et al. | 360/104 |
| 5,042,932 | A | 8/1991 | Hamilton | 360/104 |
| 5,052,105 | A | 10/1991 | Mische et al. | 29/883 |
| 5,063,464 | A | 11/1991 | Astheimer et al. | 360/104 |
| 5,065,268 | A | * 11/1991 | Hagen | 360/104 |
| 5,065,271 | A | 11/1991 | Matsuura et al. | 360/126 |
| 5,073,242 | A | 12/1991 | Hamilton | 204/192.22 |
| 5,073,836 | A | 12/1991 | Gill et al. | 360/113 |
| 5,111,351 | A | 5/1992 | Hamilton | 360/104 |
| 5,115,363 | A | 5/1992 | Khan et al. | 360/104 |
| 5,124,864 | A | 6/1992 | Matsuzaki | 360/104 |
| 5,134,608 | A | 7/1992 | Strickler et al. | 369/215 |
| 5,162,962 | A | 11/1992 | Yamauchi et al. | 360/130.34 |
| 5,164,869 | A | 11/1992 | Fontana, Jr. et al. | 360/113 |
| 5,166,845 | A | 11/1992 | Thompson et al. | 360/103 |
| 5,174,012 | A | 12/1992 | Hamilton | 29/603 |
| 5,184,265 | A | 2/1993 | Foote et al. | 360/106 |
| 5,187,625 | A | 2/1993 | Blaeser et al. | 360/104 |
| 5,189,580 | A | 2/1993 | Pisharody et al. | 360/126 |
| 5,198,934 | A | 3/1993 | Kubo et al. | 360/104 |
| 5,200,869 | A | 4/1993 | Matsuzaki | 360/103 |
| 5,225,949 | A | 7/1993 | King et al. | 360/104 |
| 5,227,937 | A | 7/1993 | Magnusson et al. | 360/104 |
| 5,239,431 | A | 8/1993 | Day et al. | 360/98.08 |
| 5,247,414 | A | 9/1993 | Mitchell et al. | 360/121 |
| 5,278,711 | A | 1/1994 | Gregory et al. | 360/103 |
| 5,282,102 | A | 1/1994 | Christianson | 360/104 |
| 5,282,103 | A | 1/1994 | Hatch et al. | 360/104 |
| 5,291,360 | A | 3/1994 | Foote | 360/104 |
| 5,296,983 | A | 3/1994 | Blanc et al. | 360/104 |
| 5,299,075 | A | 3/1994 | Hanks | 360/77.02 |
| 5,299,081 | A | 3/1994 | Hatch et al. | 360/104 |
| 5,325,254 | A | 6/1994 | Cooperrider | 360/126 |
| 5,327,310 | A | 7/1994 | Bischoff et al. | 360/103 |
| 5,490,027 | A | * 2/1996 | Hamilton et al. | 360/104 |

FOREIGN PATENT DOCUMENTS

| | | |
|---|---|---|
| EP | 0613121 A1 | 8/1994 |
| EP | 0616316 A1 | 9/1994 |
| JP | 53-29710 | 3/1978 |
| JP | S53-30310 | 3/1978 |
| JP | S-53-30311 | 3/1978 |
| JP | 59-207408 | 11/1984 |
| JP | 60-224109 | 11/1985 |
| JP | 61-42788 | 3/1986 |
| JP | 61-115204 | 6/1986 |
| JP | 63-237272 | 10/1988 |
| JP | 2-9068 | 1/1990 |
| JP | 03-198270 | 8/1991 |
| JP | 3-248308 | 11/1991 |

OTHER PUBLICATIONS

R.E. Norwood, "Damped Head Arm," *IBM Technical Disclosure Bulletin*, vol. 21, No. 8, Jan. 1979.

K. Yasuda et al., "The High Speed Flexible Disk Using a Micro-Head," *IEEE Translation Journal of Magnetics in Japan*, vol. 21, No. 8, Jan. 1979.

Akio Murata et al., "A Single Pole Type Thin Film Head with a Narrower Gap Length," *Journal of the Magnetics Society of Japan*, vol. 13, Supplement, No. S1, 1989.

Shouji Suzuki et al., "Measurement of Flash Temperature and Contact Between Slider and Magnetic Recording Disk," *IEEE Transactions on Magnetics*, vol. 25, No. 5, Sep. 1989.

Pierre Gaud et al., "A New Silicon Integrated Head for High Density Magnetic Tape Recording," *Journal of the Magnetics Society of Japan*, vol. 18, Supplement, No. S1, 1994.

PCT/US95/14680.

* cited by examiner

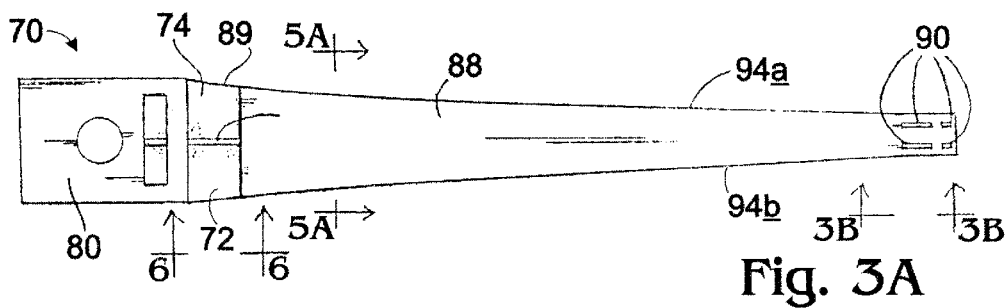
Fig. 3A
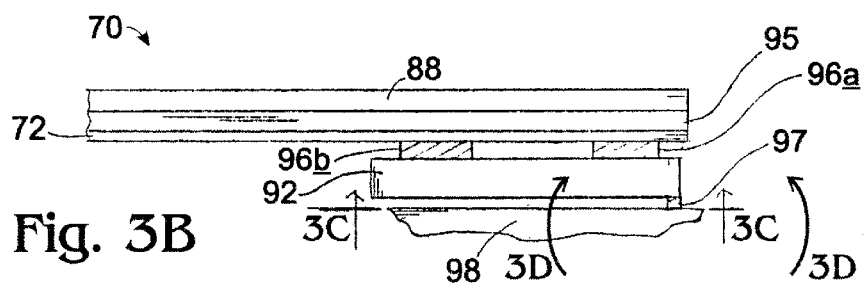
Fig. 3B
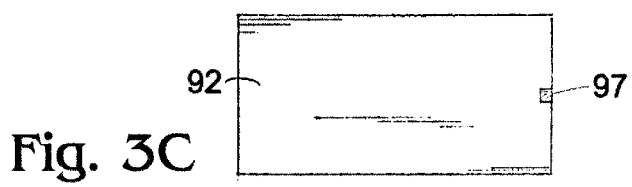
Fig. 3C
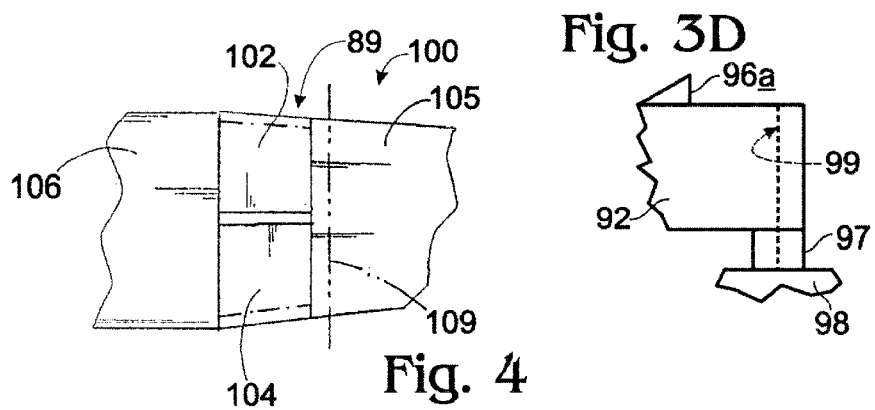
Fig. 3D
Fig. 4

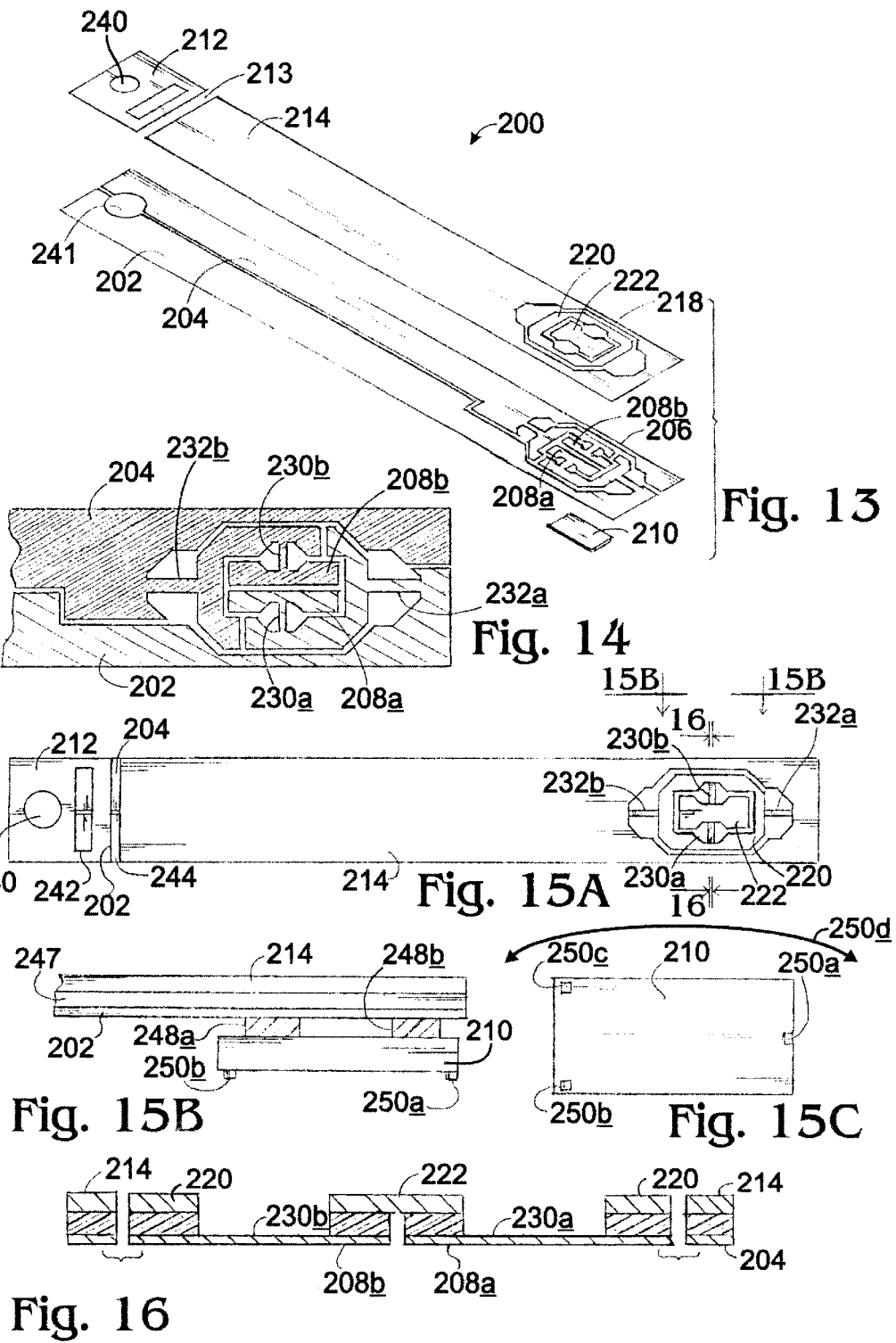

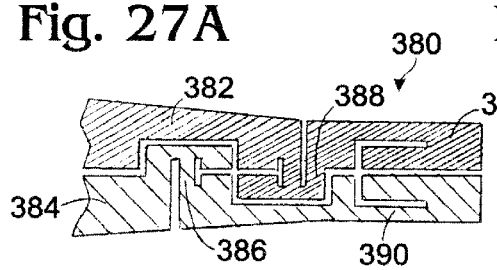
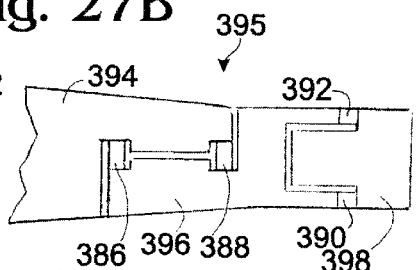
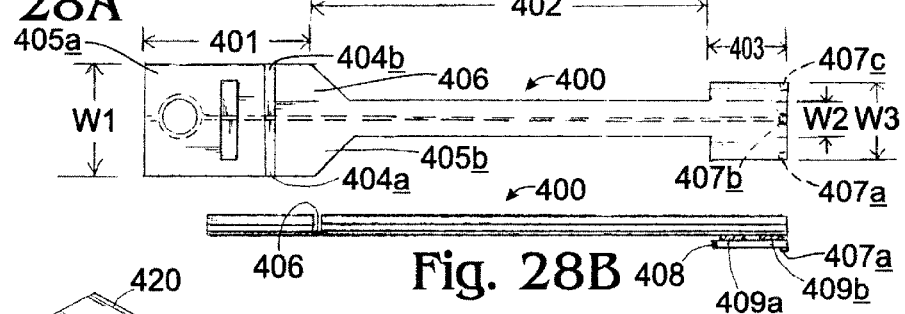
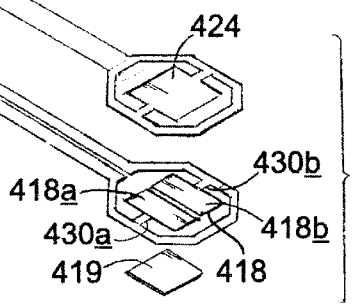
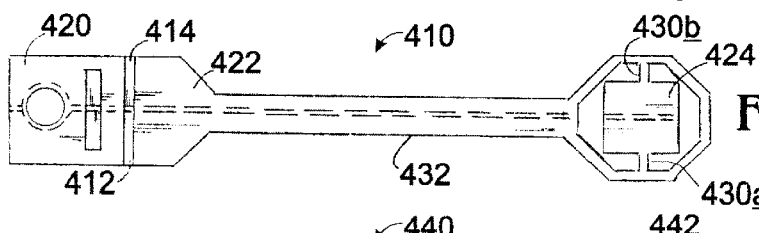
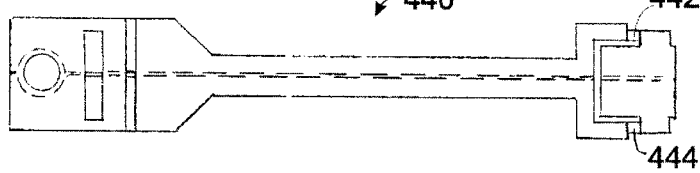

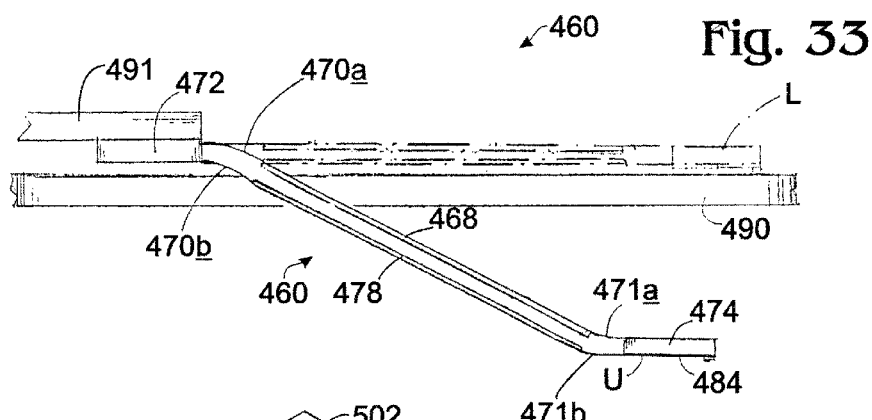
Fig. 33
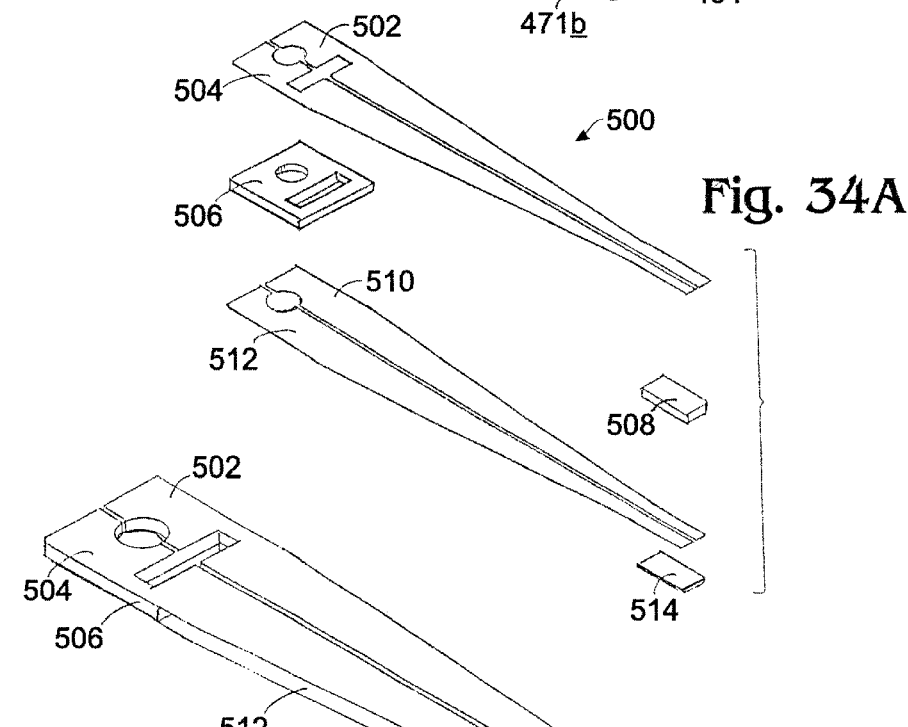
Fig. 34A
Fig. 34B

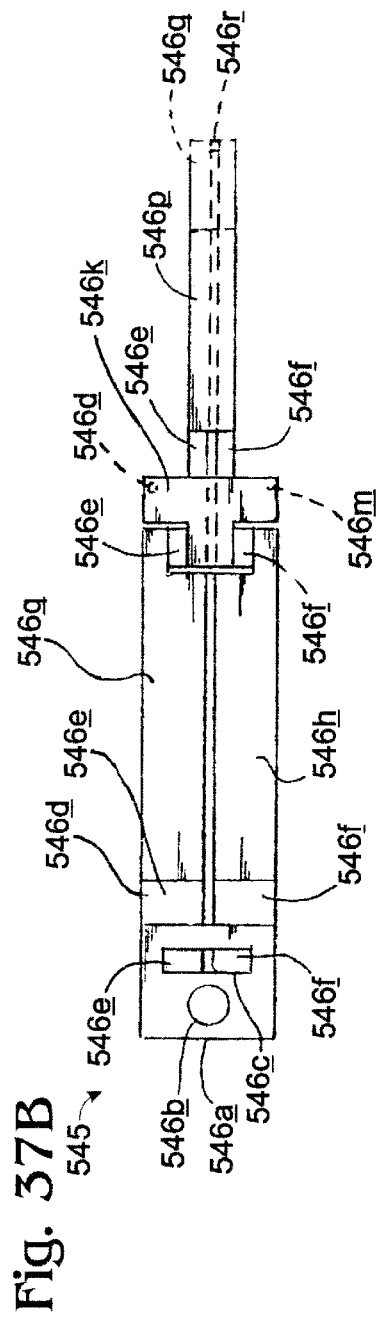
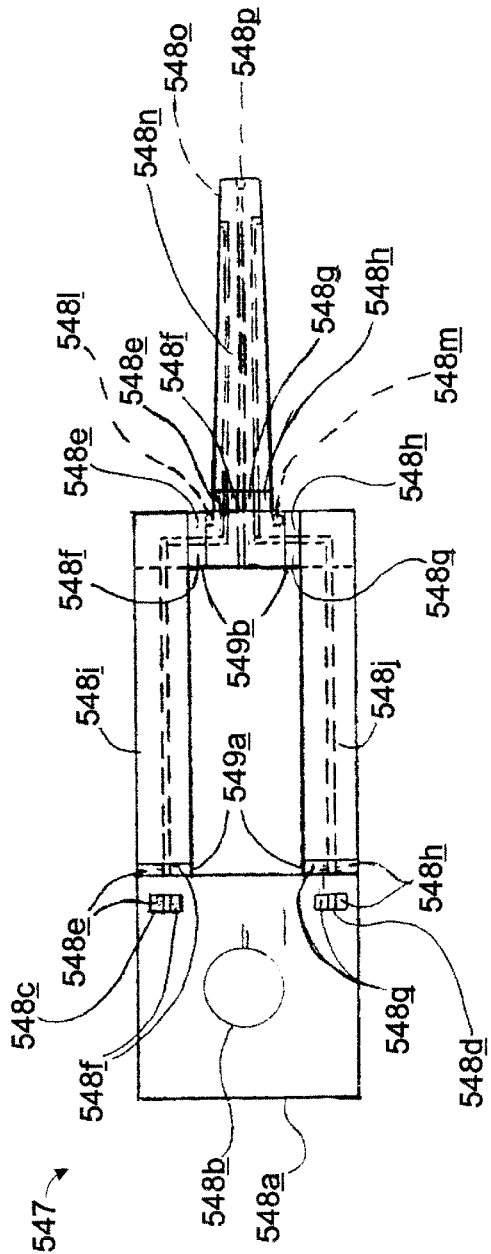

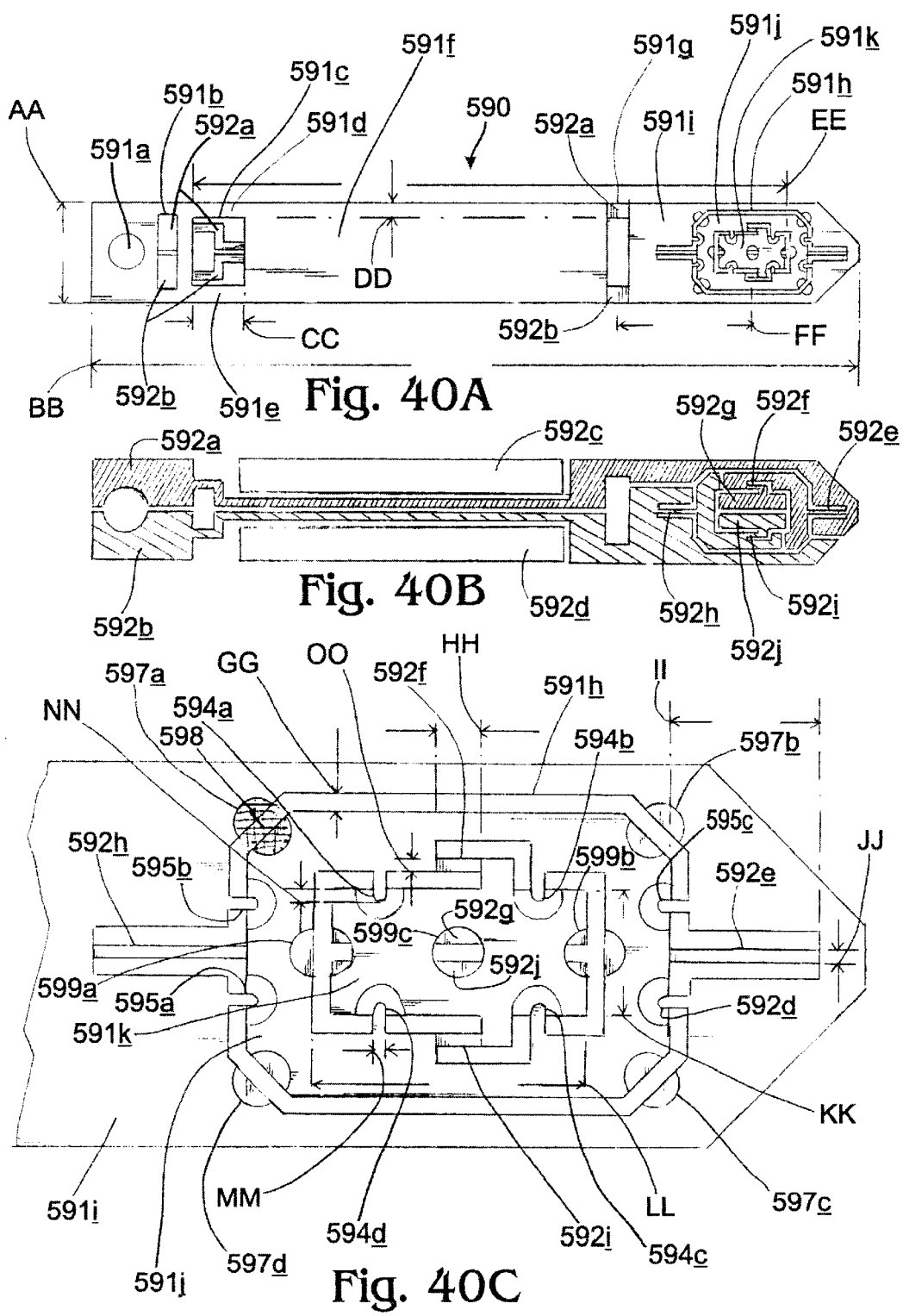

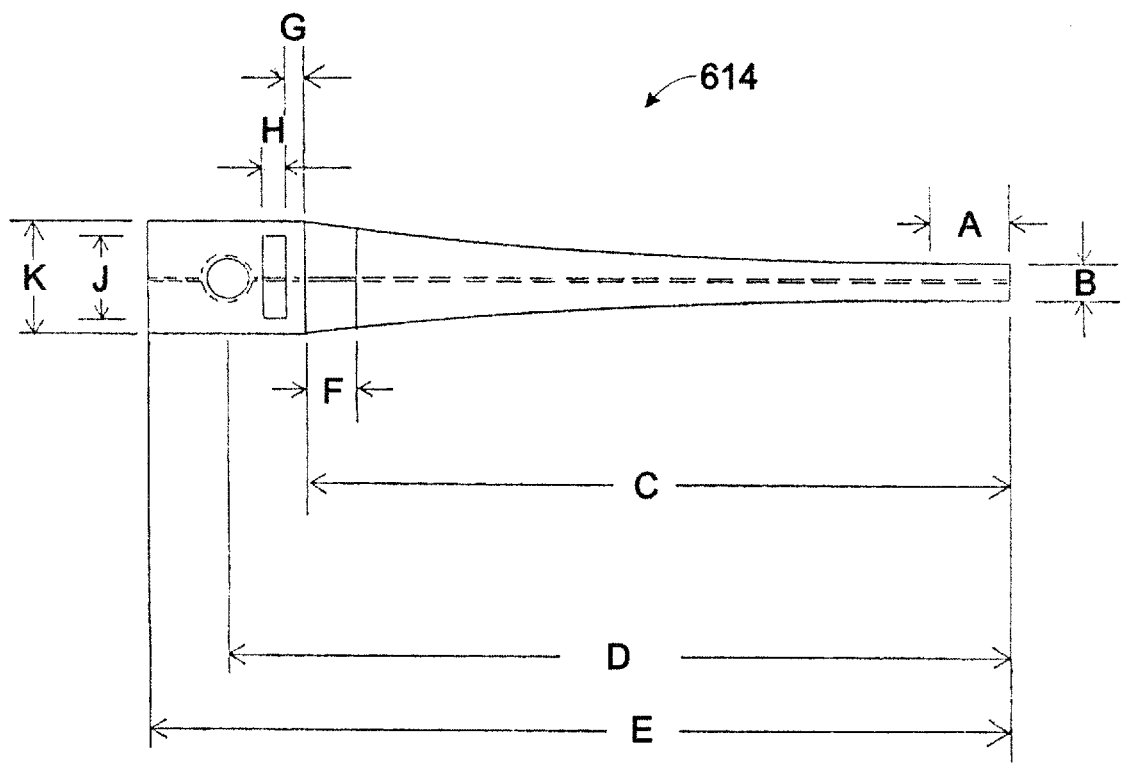
Fig. 46
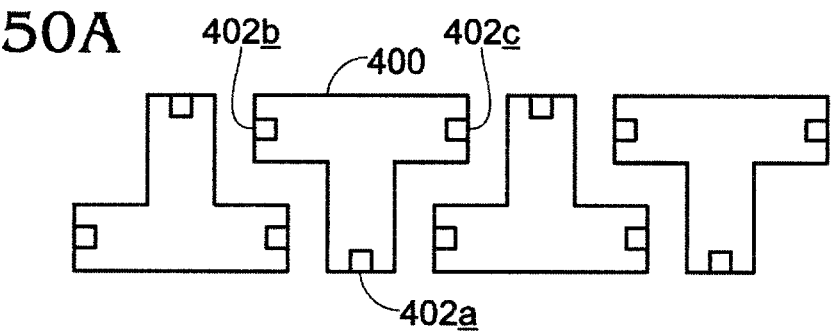
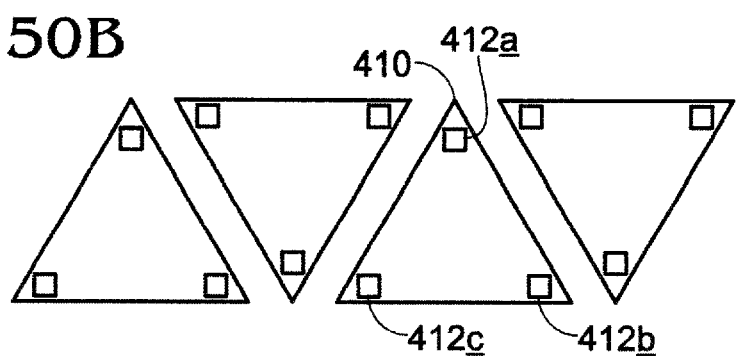

Fig. 47
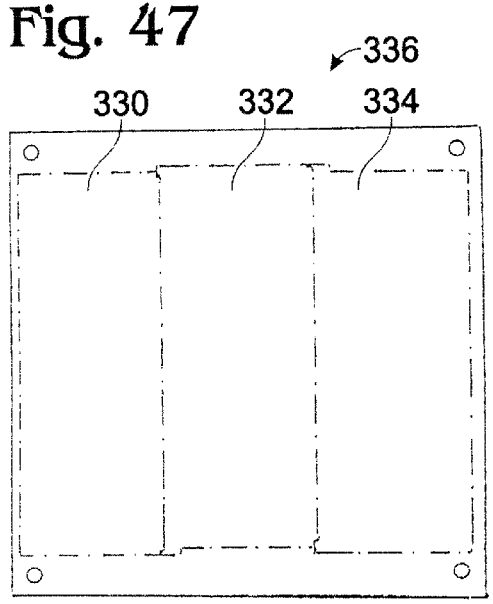
Fig. 49
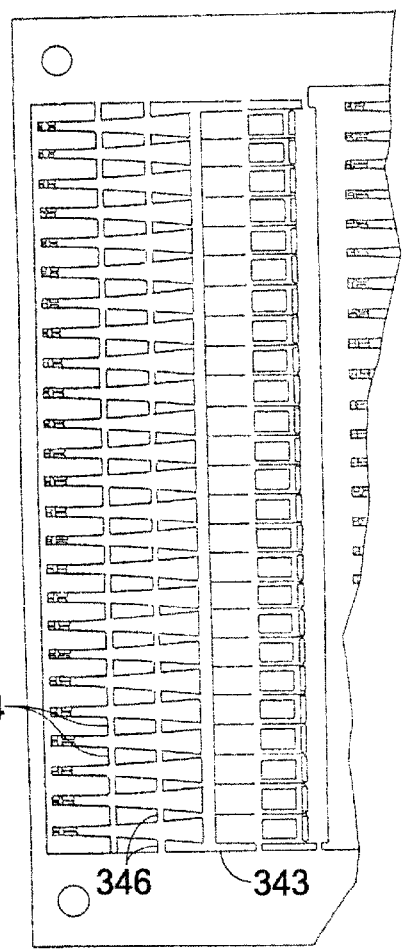
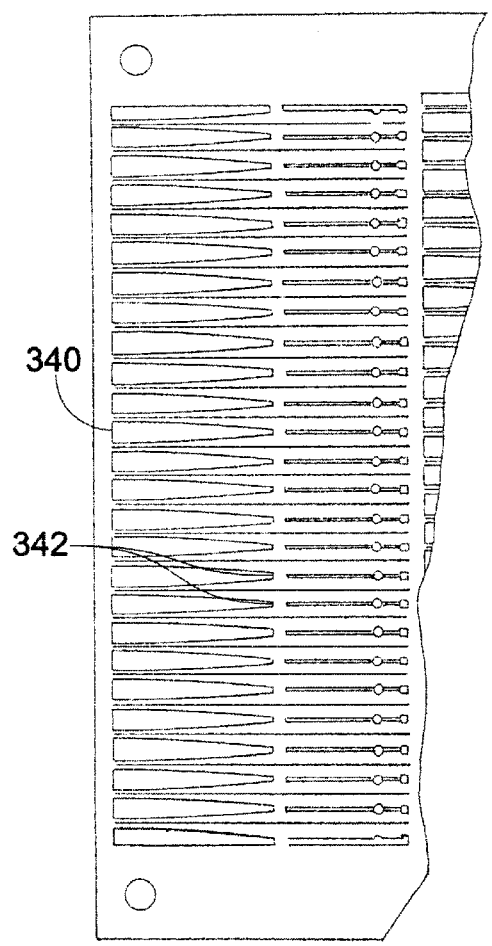
Fig. 48

TRANSDUCER/FLEXURE/CONDUCTOR STRUCTURE FOR ELECTROMAGNETIC READ/WRITE SYSTEM

This is a continuation-in-part of U.S. patent application Ser. No. 08/191,967 (now abandoned) which was filed on Feb. 4, 1994, which was a continuation-in-part of U.S. patent application Ser. No. 07/919,302 (now abandoned) which was filed on Jul. 23, 1992, which was a continuation-in-part of application Ser. No. 07/806,611, now U.S. Pat. No. 5,174,012 which was filed on Dec. 12, 1991 and issued on Dec. 29, 1992, which was a continuation of application Ser. No. 07/632,958, now U.S. Pat. No. 5,073,242 which was filed on Jul. 24, 1991 and issued on Dec. 17, 1991, which was a continuation of application Ser. No. 07/441,916, now U.S. Pat. No. 5,041,932 which was filed on Nov. 27, 1989 and issued on Aug. 20, 1991. This is also a continuation-in-part of U.S. patent application Ser. No. 07/990,005 (now abandoned) filed Dec. 10, 1992 which is a continuation of U.S. patent application Ser. No. 07/746,916 (now abandoned) filed on Aug. 19, 1991. Additionally, this is a continuation-in-part of 07/966,095 now issued as U.S. Pat. No. 5,550,691, which was filed on Oct. 22, 1992 and issued on Aug. 27, 1996 which is a continuation-in-part of Ser. No. 07/783,509 (now abandoned) filed Oct. 28, 1991. Further, this is a continuation-in-part of U.S. patent application Ser. No. 07/783,619 now issued as U.S. Pat. No. 5,490,027 filed on Oct. 28, 1991 and issued on Feb. 6, 1996. This is also a continuation-in-part of U.S. patent application Ser. No. 08/179,758 (now abandoned) filed on Jan. 7, 1994, which is a continuation of U.S. patent application Ser. No. 07/684,025 (now abandoned) filed on Apr. 10, 1991. This is also a continuation-in-part of U.S. patent application Ser. No. 08/017,984 (now abandoned) filed on Feb. 12, 1993, which is a continuation from U.S. patent application Ser. No. 07/770,593 (abandoned) filed on Oct. 3, 1991. This is also a continuation-in-part from U.S. patent application Ser. No. 08/180,540 (now abandoned) filed Jan. 12, 1994, which is a continuation-in-part from U.S. patent application Ser. No. 07/760,586 (now abandoned) filed Sep. 16, 1991. The following U.S. patent applications and patents are incorporated by reference into this application: Application Ser. No. 07/911,680, U.S. Pat. No. 5,041,932, application Ser. No. 07/990,005, application Ser. No. 07/746,916, application Ser. No. 07/966,095, U.S. Pat. No. 5,550,691, application Ser. No. 07/783,509, application Ser. No. 07/783,619, U.S. Pat. No. 5,490,027, application Ser. No. 08/179,758, application Ser. No. 07/684,025, application Ser. No. 08/017,984, and application Ser. No. 07/770,593.

FIELD OF THE INVENTION

The present invention relates to electromagnetic read/write, information storage and retrieval systems, and in particular, to the structural merging in such systems of electrical and mechanical functionality, and to ancillary matters that surface as structural, organizational opportunities as a result of such merging. Recognizing that the various features of the invention can have important applicability in a wide range of kinds of such systems (e.g., rigid-disk, floppy-disk, drum, tape, etc. systems), the description which follows herein focuses attention on rigid-disk systems—an arena which is most central in today's commercial applications. Accordingly, specification and claim references made herein to rigid disks should be read to include these other-kinds-of-media systems.

Given the merged-functionality aspect of the present invention, many features thereof, accordingly, focus upon improvements in mechanical load-bearing and in motion-articulating characteristics of transducers, and of flexures which carry such transducers, that are used in these kinds of systems. In this context, the field of the invention encompasses systems wherein (a) a read/write transducer flies over a media recording surface, (b) such a transducer is intended for contact-capable operation, and operates with intermittent media-surface contact, and (c) such a transducer is intended for contact-capable operation, and operates in substantially continuous contact with a media recording surface.

BACKGROUND AND SUMMARY OF THE INVENTION

In the march of progress which has characterized ongoing development of disk-drive, electromagnetic read/write systems, the quests for enlargement of a real recording density, and for improved-quality read/write signal communication between a disk's recording surface and a transducer, have been high on the list of technical interest and relentless pursuit. This situation has been reflected, inter alia, in significant reductions in components' sizes and masses, by reductions in the "effective masses" of those components which react dynamically during read/write operations, and in dramatic reduction in the separation which exists between the working read/write zone of a transducer and a disk's recording surface. These advances include, according to an important line of development by the Censtor Corporation of San Jose, Cali., system embodiments in which a read/write transducer operates in substantially continuous sliding contact with such a recording surface. The latter line of advancement in the art of disk-drive recording is well illustrated and expressed in the parent patent and patent applications which have been set forth hereinabove.

Pausing for a moment at this point to focus upon prior art efforts by others to bring about size reductions, it is important to bear in mind that these prior art changes have, by and large, been accomplished with what might be thought of as a segregated rather than a merged focus upon the three core functionalities—electrical, mechanical and magnetic—of read/write transducers and supporting flexures. In other words, prior art thinking has looked upon the respective components in this environment which offer each of the individual functionalities as being essentially independent of the other-functionality components. As a consequence, there has been somewhat of a naturally perceived limit in how far one can go to bring about significant size reduction—a limit dictated by functional performance constraints, and even more appreciably, probably, by manufacturing-costs and manufacturing-capabilities constraints.

Specifically, and looking for a moment just at the issue of mechanical load bearing, prior art thinking has been based upon the notion that once necessary mechanical load-bearing requirements are known, all of that structure which has been looked upon in the past as being the sole constituent attending to that functionality can only be reduced in size just so much if it is to remain practically manufacturable. However, beginning with the work of Hal Hamilton as such is expressed in the above-referred-to '932 patent, a new kind of thinking has entered this art, whereby "merger of functionality" is viewed as providing an opportunity for retaining all necessary electrical, mechanical and magnetic capability, while at the same time allowing for substantial shrinking of overall size, and actual improvement in practical manufacturability. More particularly, in the Hamilton '932 disclosure, there surfaces a recognition that electrical current-carrying structure can be utilized significantly to carry mechanical load, and conversely, that mechanical load-bearing structure can be utilized significantly to carry electrical current. In other words, what might be thought of as singular-character structure, or material, functions in multiple ways. Not only does this unique way of thinking about merged-functionality yield surprising size- and mass-reduction opportunities, but also it tends to lead toward structures which are inherently simpler in form and in construction, and less complex and costly to fabricate.

It is this "merged-functionality" view which underlies key contributions made to the art by the present invention.

Continuing, and directing attention to other matters upon which this invention is focussed, in the ever more intimate environment of the interface between a disk's recording surface and a read/write transducer, and in addition to the size, mass, effective mass and spacing issues just generally expressed, many other considerations sit as important participants at the table of key technical concerns. For example, tight control over, and maintenance of, a very precise XYZ spacial location of a transducer in relation to a disk surface is critical, as is the ability of the transducer and supporting flexure structure to respond rapidly and fluidly to disk-surface topographical features, and/or to other things and events which require speedy, accommodating, operating-attitude adjustment. This kind of adjustment must take place in a manner minimizing as much as possible any occasions of signal-communication drop-out, and in a manner free of disruptive resonance vibrations. Attention also must be addressed to damping and shock-absorbing issues.

All of these considerations need to be taken into account as well (a) in systems where a transducer flies over a disk's recording surface, (b) in systems where contact operation occurs (intermittently or continuously), and (c) in systems which, on the one hand, have gimbaled transducer structures, and on the other hand, non-gimbaled transducer structures.

In the gimbaled transducer setting, the merged functionality focus aspect of the invention opens the door to the fabrication and use of a load-bearing transducer chip which has a substantially planar body, with plural, projecting disk-surface contact feet, or pads, and which can operate, relative to a disk's recording surface, with substantially a zero-angle-of-attack, and with the read/write portion of the transducer in intimate contact with that surface. This, in turn, offers the opportunity for electromagnetic design which occupies space in the plane of the body, and which allows for placement of the read/write zone anywhere relative to that body.

Given the above remarks and comments, it is an important object of the present invention to offer transducer/flexure improvements along the lines just suggested —focused on the notion of structural merging, for example, of electrical and mechanical functionality.

A related object of the invention is to provide such improvements which lead toward simple, low-cost, low-mass structures that offer the opportunity for appreciable enlargement in areal density of recorded information, with reliable and improved signal-communication characteristics.

Thus, an important object is to provide a head/flexure structure which includes load-bearing (merged-functionality) conductors.

A related object is to provide a head/flexure structure in which the conductors perform mechanical functions in addition to their function of conducting electrical signals between a head and other circuitry.

Still another object of the invention disclosed herein is to provide a flexure/conductor structure which supports a head in a precise location and orientation relative to the surface of a medium.

Yet a further invention object is for the head-supporting flexure to be capable of supporting the head in a contacting relationship with the disk while reading or writing, without the occurrence of catastrophic head crash events or excessive interface wear.

Also, an object of the invention is to provide a flexure/conductor structure which is capable of moving the head along a Z-axis, i.e., that axis which is normal to the surface of the disk, with a minimal degree of angular rotation, i.e., minimizing the angular constant.

Another object is to provide a flexure/conductor structure which exhibits maximum levels of lateral and torsional resonant frequencies with the minimal amount of gain.

Still a further object is to provide a transducer/flexure/conductor structure which has a minimal number of parts, and which can be produced by a relatively straight-forward and cost-effective process, including, in certain cases, an automated assembly process.

Another object is to provide a flexure/conductor structure which is capable of compensating for topographical irregularities in the surface of the recording medium.

Yet another object of the invention is to provide a flexure/conductor structure in which the head is allowed a certain range of pitch and roll movement independent from the flexure.

A further object is to provide a head/flexure structure which has a tunable hinge near its proximal end.

Other objects include providing a head/flexure structure which: (a) is wireless; (b) is amenable to compact disk-to-disk stacking; and (c) contains more than one pair of conductors.

Still a further object is to provide a head/flexure structure which has a gimbal including conductive articulators.

Thus, the inventive subject matter presented herein regards improvements in transducer/flexure structure for an electromagnetic read/write system, and relates, inter alia, to structures, such as flexures, for carrying electromagnetic read/write transducers, and more particularly, to such structures wherein electrical conductors which connect with such transducers are utilized significantly, in an augmentive way, as mechanical load-bearing and articulating elements in the structures. The subject matter of the invention also relates to contact-capable read/write systems in which the read/write transducer acts directly as a load-bearing structure under disk-contact conditions. According to an important aspect of the invention, therefore, such augmented-role conductors play the dual roles of (a) conducting electrical signals between a transducer and remote, external circuitry, such as a signal processor, and (b) at the same time supporting mechanical load (such as a bending and/or articulating load), including, in certain embodiments, 100% of that load in a certain portion or region of a transducer-carrying structure.

Fundamentally, the subject matter of the present invention rests on several key concepts, some of which spring from the notion that innovation in the load-carrying/articulation characteristics of transducer-carrying structure can significantly enhance overall read/write system performance. One of these concepts—based upon a new and striking "merged-functionality" recognition—is that the very same conductors which carry signal-bearing information to and from a read/write transducer can also function mechanically as the articulating and load-bearing beam structure which carries and supports such a transducer, statically and dynamically, for instance, in the setting of a cantilever-type support arrangement for a disk read/write transducer. This conceptual thought carries also into an arrangement where, effectively, the transducer is supported for gimbaling action, with the recognition that what might be thought of as the gimbal articulators (hinges or torsional beams) can be formed by electrical-current-carrying conductors.

Another foundation concept is that the flexure/beam transducer-carrying construction can take important advantage of what can be viewed as bilateral motion independence, wherein a pair of spaced beam components afford a single- or dual-axis articulation capability to a supported transducer. Indeed, such construction can enable dual-degree-of-motion gimbal action (as just suggested above) for such a transducer. The shift of mechanical articulation and load-bearing responsibilities to signal-carrying conductors is an especially useful concept in so-called micro-flexure designs where extremely small mechanical structures are involved.

A further important concept is that a read/write transducer can itself be utilized as a load-bearing structure—a concept leading, inter alia, toward minimizing of the size and mass of the overall transducer/flexure/conductor structure.

In addition to the structural contributions made by the present inventive subject matter, also furnished thereby are novel methods of producing micro-transducer-support structures employing signal-carrying conductors as mechanical load-bearing/articulating elements such, for example, as hinges, torsional beams, etc.

These and other objects, advantages and features that are offered by the present invention will become more fully apparent as the description which now follows is read in conjunction with the accompanying drawings.

DESCRIPTION OF THE DRAWINGS

FIG. 1A is a side view of the transducer/flexure, loaded on a disk, in relation to an XYZ coordinate system. FIG. 1B is a cross-sectional view of the flexure shown in FIG. 1A, with this view being taken generally along line 1B—1B in FIG. 1A.

FIG. 3A is a top view of the transducer/flexure shown in FIG. 2.

FIG. 3B is a partial side view of the distal end of the transducer/flexure shown in FIG. 3A.

FIG. 3C is a bottom view of the transducer chip shown in FIG. 3B.

FIG. 3D is an enlarged, fragmentary view of the area in FIG. 3B embraced by curved arrows 3D—3D, illustrating a modified form of transducer pole and coil structure.

FIG. 4 is a partial top view of a flexure, focusing on the hinge region.

FIG. 13 is an exploded perspective view of a transducer/flexure with load-bearing conductors, a hinge near the proximal end of the flexure and a gimbal near the distal end of the flexure.

FIG. 14 is a partial top view of the conductors shown in FIG. 13, focusing on the distal ends of the conductors, specifically, the conductor gimbaling structure.

FIG. 15A is a top view of the transducer/flexure shown in FIG. 13, assembled.

FIG. 15B is a partial side view of the transducer/flexure shown in FIG. 15A.

FIG. 15C is a bottom view of the transducer shown in FIG. 15B.

FIG. 16 is a thin-layer sectional view of the flexure shown in FIG. 15A.

FIG. 27A is a partial top view of a two-conductor gimbaling structure that forms part of a transducer/flexure which employs hinges to allow roll and pitch movement of the chip.

FIG. 27B is a partial top view of the gimbaling structure shown in FIG. 27A, with the addition of stiffening layers.

FIG. 28A is a top view of a first embodiment of a torsionally compliant transducer/flexure.

FIG. 28B is a side view of the transducer/flexure shown in FIG. 28A.

FIG. 29A is an exploded perspective view of a second embodiment of a torsionally compliant transducer/flexure, with a pitch gimbal mechanism.

FIG. 29B is a top view of the transducer/flexure shown in FIG. 29A.

FIG. 30 is a top view of a third embodiment of a torsionally compliant transducer/flexure with a pitch gimbal.

FIG. 33 is a side view of the transducer/flexure shown in FIGS. 31 and 32. The flexure is shown in its pre-bent unloaded position (solid lines), and in its loaded or operating position (dash-dot lines).

FIG. 34A is an exploded perspective view of another dual-cantilever transducer/flexure.

FIG. 34B illustrates the transducer/flexure of FIG. 34A, assembled.

Each of FIGS. 37B and 37C is a top view of a transducer/flexure of the present invention including an alternative gimbal design.

Figure 38A:
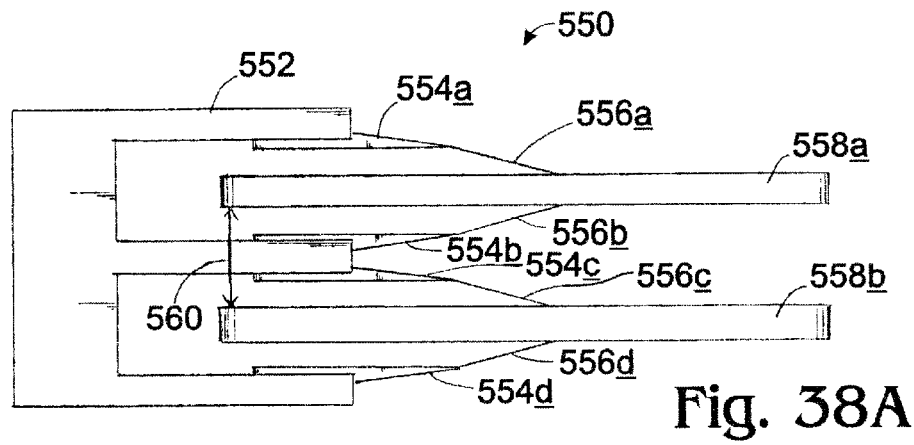

FIG. 38A is a schematic side view of a flexure mounting system showing disk-to-disk spacing with respect to an E-block and mounted flexures.

Figure 38B:
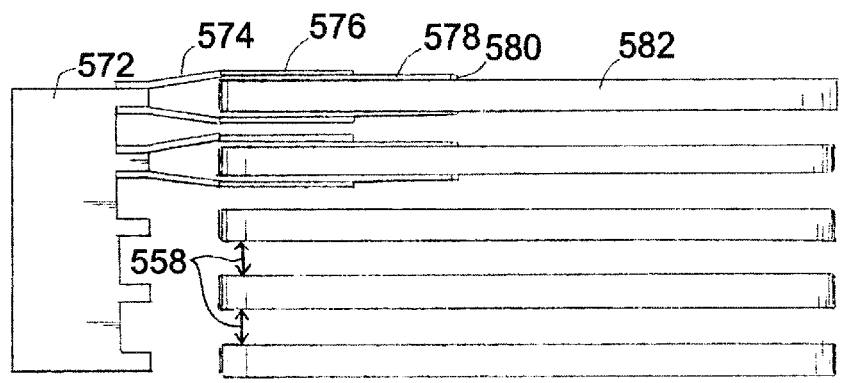

FIG. 38B is a schematic side view of a modified flexure mounting system employing dual-cantilevers to permit closer disk-to-disk spacing.

Figure 38C:
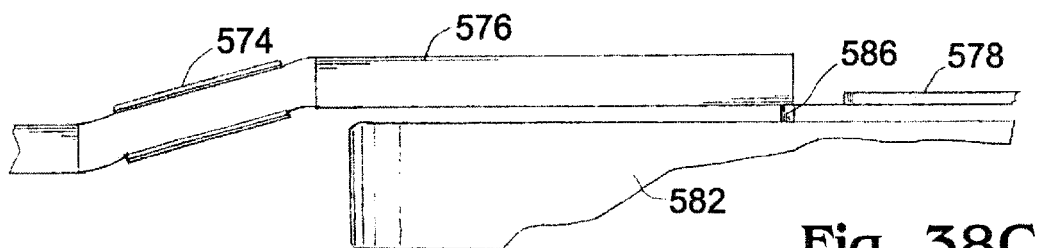

FIG. 38C is a partial side close-up view of one of the flexures and dual-cantilever mount structures shown in FIG. 38B.

Figure 39A:
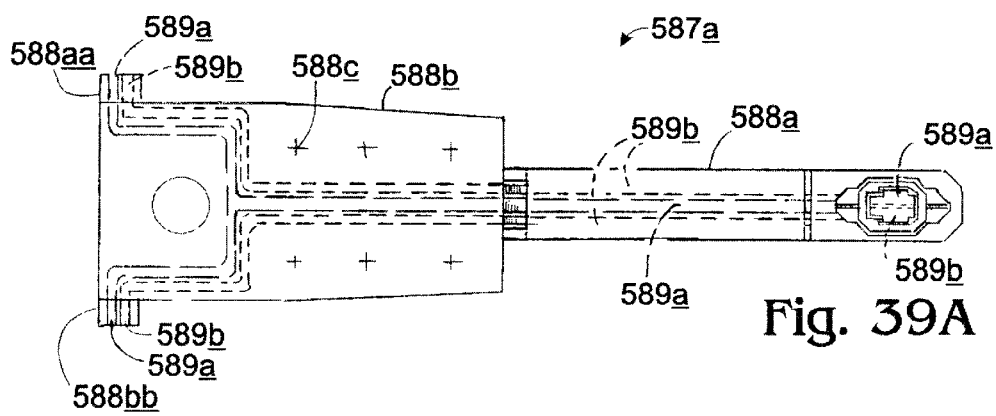

FIG. 39A is a schematic top view of a transducer/flexure mounted on a nut plate and including a two-conductor configuration with versatile, redundant connective tabs on opposite sides with the proximal end of the flexure/nut-plate structure.

Figure 39B:
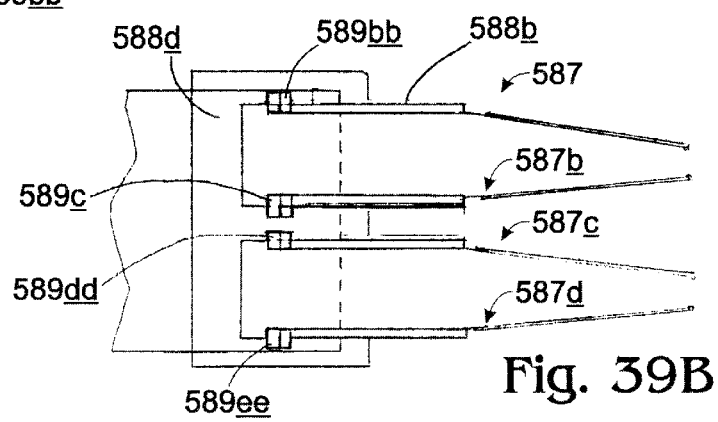

FIG. 39B is a schematic side view of four flexure/nut-plate structures as shown in FIG. 39A, mounted in an E-block and electrically connected to a flex cable.

Figure 39C:
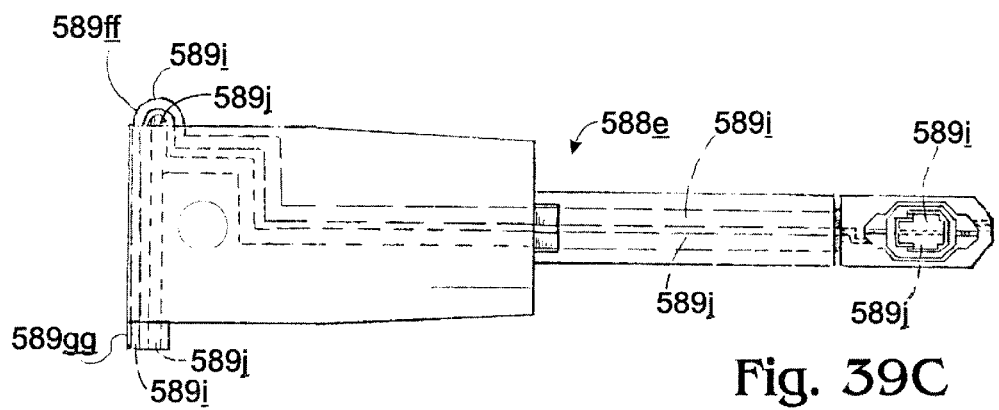

FIG. 39C is a schematic top view of another nut-plate/flexure embodiment with versatile, redundant connector conductor tabs.

FIG. 40A is a top view of a gimbaled flexure embodiment which is dimensioned to operate under a minimal load.

FIG. 40B is a top view of the conductor configuration employed in the flexure shown in FIG. 40A.

FIG. 40C is an enlarged partial top view of the flexure shown in FIG. 40A.

Figure 40D:
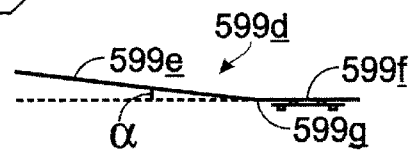

FIG. 40D is a schematic side view of a transducer/flexure with a pre-bend near its distal end.

FIGS. 41–45 are schematic top view layouts of sheet intermediate materials used in a production method of the present invention.

FIG. 46 is a top view of a flexure resulting from the process illustrated in FIGS. 41–45. Relative dimensions of the final flexure structure are shown.

FIGS. 47–49 are schematic top view layouts of sheet intermediate materials used in another production method of the present invention.

FIGS. 50A and 50B show working-side views of two modified forms of transducer chips.

DEFINITIONS

Terminology in the specification and claims should be interpreted in accordance with the following definitions.

A "flexure" is a flexible cantilever beam, with or without gimbal structure, for supporting a transducer adjacent a medium. A "suspension" may refer to a flexure, either alone or together with a flexure mounting system.

A "transducer" is an electromagnetic working organization, or unit, employed typically near the distal end of a flexure directly adjacent a medium in a read/write system. The transducer includes pole and coil substructures and the embedding material surrounding the substructures. A pole has a read/write working region. As used herein, the transducer does not include ancillary joined structure such as air bearing rails in a conventional flying slider. In at least one embodiment of the invention, the transducer is provided as an integrated component of the flexure. In other embodiments, the transducer is in the form of a chip which is joined to the distal end of the flexure. Each transducer has a working side which faces the recording surface in a magnetic medium during normal read/write operations.

At various locations throughout this specification reference is made selectively to the top and bottom sides of different structures. Where these terms are applied to a disk surface, it is assumed that the related disk is operating in a horizontal plane. Where these terms are applied to flexure, beam, transducer structures inside of the transducer, and top side refers to the opposite side.

Figure 1A:
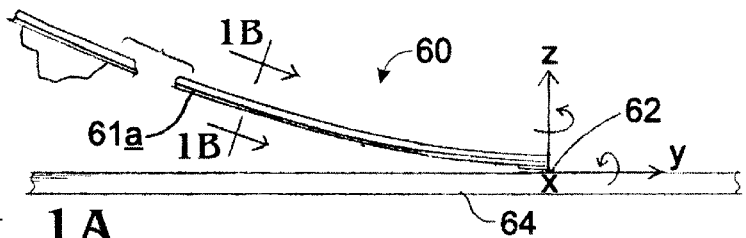
FIGS. 1A and 1B are views of a transducer/flexure which is disclosed and claimed in U.S. Pat. No. 5,041,932.

The "Z-axis" is perpendicular to the surface of a recording medium and extends vertically through a transducer mounted on the free end of a flexure. A limited range of movement of the transducer along the Z-axis is allowed, as the transducer follows disk surface topography, during and between reading and writing activity. An "X-axis" and a "Y-axis" share a common origin with the Z-axis at the center of the distal edge of the transducer, and are perpendicular to each other in a plane which is co-planar with the upper-most surface of the medium when the transducer is operating in contact with this surface. The Y-axis is generally "longitudinal", i.e., parallel to the length of the flexure. The X-axis is generally "lateral", i.e., parallel to the width of the flexure. The X, Y and Z axes are illustrated in FIG. 1A relative to the distal tip of a transducer/flexure 60. The point of contact 62 between the transducer and disk 64 coincides with the origin of the coordinate system.

"Roll", "pitch" and "yaw" refer to particular types of inclinational movement of a transducer relative to its static or idealized suspended position adjacent the surface of a medium. "Roll" refers to rotational movement about the Y-axis of a transducer adjacent the surface of a recording medium. "Pitch" refers to rotational movement around the X-axis of a transducer adjacent the surface of a recording medium. "Yaw" refers to rotation around the Z-axis of a transducer adjacent the surface of a recording medium.

"Load-bearing" is defined and used, inter alia, in the context of a cantilever flexure which has a mounting end and a free end extending generally horizontally over (adjacent) the surface (upper or lower) of a recording medium, for example, a rigid disk. The free end of the flexure supports and positions a transducer for reading and writing information on the surface of a medium. By deflection, the free end (distal end) of the flexure is applied by a force (load) against either the surface of the medium or an air-bearing directly on top of the surface. Elements of the flexure which provide significant support for the load, i.e., maintenance of desired Z-axis position of the transducer, are referred to as "load-bearing" structures. "Load-bearing" also relates to "articulation" (defined below) structure.

A "beam" is a transverse structural member which provides partial or complete support for a transducer adjacent the surface of a recording medium. The term "beam" may be used referring to the entire flexure body, or a load-bearing component of the body.

"Anisometric" means inequality of measurements or properties. The term is used in this application with reference to a beam's axis-differentiated bending stiffness—i.e., regarding a beam having a preferential bending axis.

"Articulation" is used with respect to two structural members (sometimes referred to as "arms") which are linked together, but allowed a certain degree of movement relative to each other. An "articulator" is a semi-rigid structure connecting first and second parts, which permits a selected range and type of mechanical movement of the parts relative to each other. An "articulating conductor" is an electrical conductor which also functions as an articulator. A "hinge articulator", also referred to as a "beam/articulator structure", is an articulator (unit, element) which bends around an axis perpendicular to a line centrally and directly connecting the two parts (also referred to as a "longitudinal axis"). A "torsional articulator" is an articulator (unit, element) which twists around an axis centrally and directly connecting the two parts (longitudinal axis). A "torsional beam" is a torsional articulator. A "mixed-mode articulator" (unit, element) is a hybrid of a hinge articulator and a torsional articulator.

"Hinge" is a connector between two parts which allows a degree of movement, i.e., bending, of the parts relative to each other.

"Proximal" is used to refer to the end vicinity of a flexure which is structurally anchored or secured to a read/write system frame or servo-control actuator. The proximal end of the flexure is also referred to as the "mounting end".

"Distal" is used to refer to the end vicinity of the flexure which carries the transducer and is also referred to as the "free end".

"Angular constant" is defined, relative to a cantilever flexure, as the degree of angular change at the distal tip of the flexure for a given deflection.

A "pad" (also referred to as an island) projects from a side or face of a flexure or a transducer chip and contacts the surface of a disk when the transducer/flexure is operating to read or write information from the disk. With respect to flexures which employ gimbals, a triangular organization of three pads is sometimes used, and referred to as a "tripad" or "trident" structure.

DETAILED DESCRIPTION OF INVENTION

The invention, resting strongly on the merged-functionality concept set forth above, involves load-bearing and articulating structures for use in suspensions relating to micro-flexures which support transducers in electromagnetic read/write systems. These structures take the forms of load-bearing conductors and transducers, hinge-like mechanisms, torsional beams, and flexure mounting systems which allow production and implementation of flexures with low angular constants, minimum mounting tolerances, and/or the capability of tolerant compliance of the transducer with an inherently irregular recording medium surface: An important aspect of some of the transducer/flexures disclosed and claimed in the present invention is the use of electrical conductors and transducers which are geometrically designed and arranged to provide load-bearing support, as well as articulable movement, between linked portions of the flexure body.

Figure 1B:
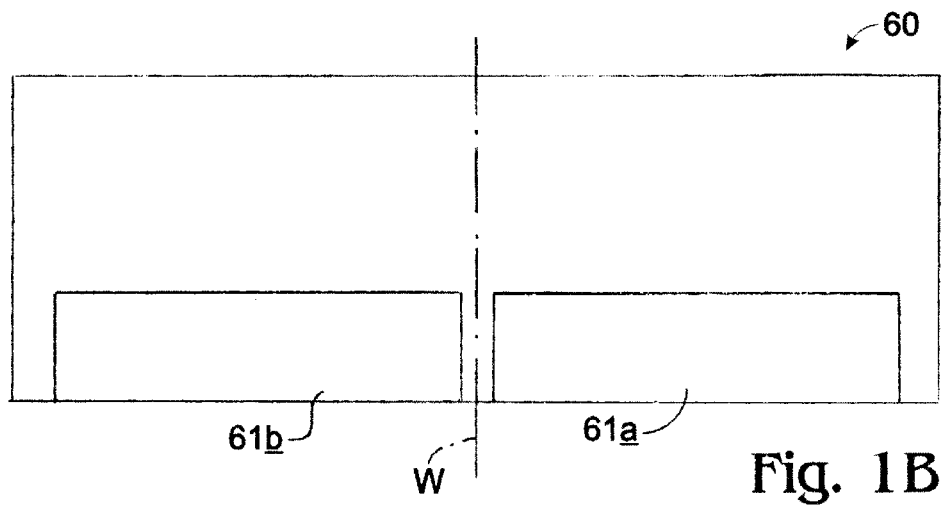

FIGS. 1A and 1B illustrate a micro-flexure 60 (flexure/conductor/transducer structure), including an integrated transducer, or transducer unit, which was originally described and claimed in parent U.S. Pat. No. 5,041,932. The transducer, which is a tiny portion of the overall structure pictured in FIG. 1A, is located at the distal tip shown at 62. This transducer includes magnetic pole structure and coil and conductor structure all embedded in a small volume of surrounding joinder structure. It is in the disclosure of the '932 patent that the notion of merged-functionality makes its important debut in the read/write, disk drive transducer/flexure context. It is also in the '932 patent that one finds the introduction of a load-bearing transducer unit. Reference to the text and drawings of the patent will reveal a novel transducer unit having pole structure unified with (and within) a disk-contacting wear pad (or projection), and generally planarly distributed, coupled coil structure which extends generally in a plane parallel with the plane of the wear pad's disk-contacting face.

As shown in FIGS. 1A and 1B, micro-transducer/flexure 60 includes integrated load-bearing conductors 61a and 61b embedded within flexure 60 along its entire length (continuum structure). An integrated transducer is embedded within flexure 60 at its distal tip 62 where it contacts disk 64 during operation of the read/write system. A number of important features of the present invention, which are more extensively developed in the embodiments illustrated and described below, are fully present in the micro-transducer/flexure structure illustrated in FIGS. 1A and 1B. First, as shown in FIG. 1B, integrated conductors/beams 61a and 61b are massive enough relative to the entire flexure body 60 to support a significant portion of the cantilever load. According to the teachings of the '932 patent, conductors 61a, 61b occupy in the range of about 13% to about 40% of the full thickness of the body of flexure 60. Therefore, conductors 61a and 61b play a dominant mechanical role, and are referred to as "load-bearing conductors". Another important physical attribute of conductors/beams 61a and 61b is their generally rectangular or "blade-like" cross-sectional shape which provides preferential (anisometric) bending, allowing the tip to move in a direction along the Z-axis. The blade-like shapes of conductors 61a and 61b are also contributors to a relatively high lateral-frequency characteristic for flexure 60. Still another interesting geometric feature of conductors 61a and 61b is their symmetrical organization about plane W which bisects flexure 60 along its length. Between their opposite sets of ends, these conductors are also referred to as substructure spans.

A second important load-bearing structure embodied in the transducer/flexure of FIG. 1A, as briefly mentioned earlier, is the transducer itself (the embedded pole structure and coil and conductor structure mentioned earlier) located at the distal tip of flexure 60. Unlike flexures/transducers in the prior art, such as transducers joined to massive load-bearing, sliders, in which the transducer carries essentially none of the deflected beam load, the transducer integrated in the distal tip of flexure 60 directly contacts disk 64 and carries 100% of the cantilever load—i.e., directly through the embedded pole, coil, and conductor structure. The uses of load-bearing conductors and a load-bearing transducer in a transducer/flexure device, provide examples of a major theme of the present invention, namely, to design multi-functional (i.e., merged-functionality) components so that structures, such as conductors and transducers, which traditionally have had no mechanical function in prior art devices, become "mechanical activists" in the present invention, in addition to playing their traditional roles of conducting electrical signals and handling magnetic flux.

Figure 2:
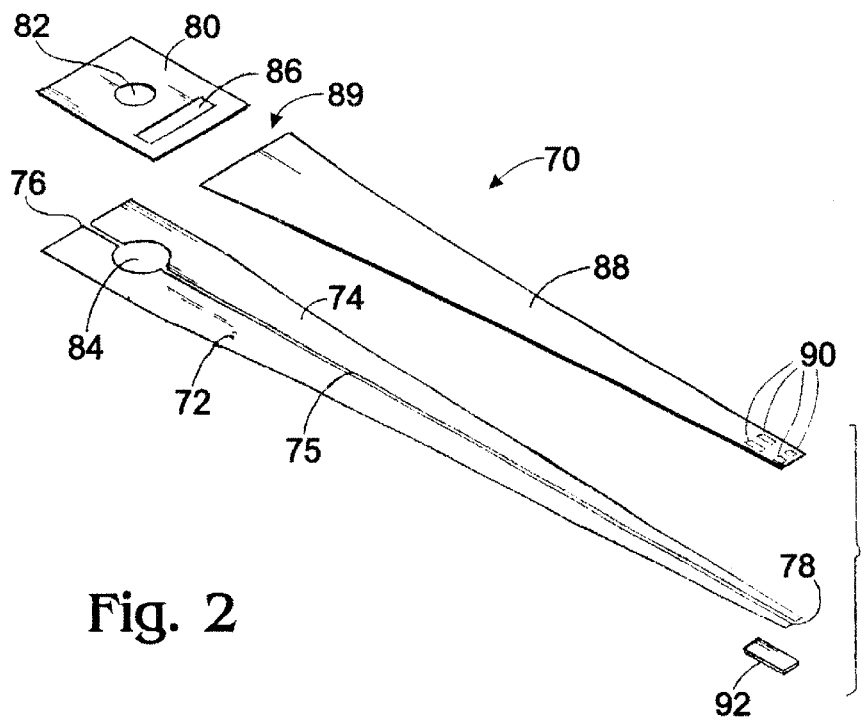
FIG. 2 is an exploded perspective view of a tapered transducer/flexure structure with load-bearing conductors and a hinge.

A related micro-flexure structure 70 with load-bearing conductors, or conductor elements, and a proximal hinge, or hinge region, is illustrated in FIG. 2. Micro-flexure 70 includes two, relatively flat, blade-like conductors (continuum structure) 72 and 74. Conductors 72 and 74, which form a common conductive layer, are insulated from each other by space 75. Conductors 72 and 74, collectively, have a tapered shape, and are widest at proximal (mounting) end 76 and narrowest at distal (free, disk-confronting, transducer-carrying) end 78. End 76 is also referred to herein as a base region. A proximal stiffener layer, or stiffener, 80 overlays the proximal ends 76 of conductors 72 and 74. Stiffener 80 has a hole 82 centrally located above a hole 84 defined by conductors 72 and 74. Holes 82 and 84 are used for alignment of the suspension to a mounting surface in a disk-drive system. A rectangular window 86 in stiffener 80 provides access to the top sides of conductors 72 and 74 for electrical bonding. Distal and proximal bonding regions of conductors 72 and 74 are preferably gold plated. A second stiffener 88 extends from a "hinge region" 89 near the proximal end of the flexure, to the distal end of the flexure. Hinge region 89, defined by the gap between stiffeners 80 and 88, is shown more completely in FIG. 3A, FIG. 4 and FIG. 6. The structural regions located longitudinally on opposite sides of the gap are also referred to herein as arms. Four windows 90 in stiffener 88 provide access to the conductors for heating them in the process of connecting a transducer chip 92 to the bottom side of conductors 72 and 74. Chip 92 contains, for example, a probe-type read/write transducer (not illustrated), the probe in which extends toward the disk's recording surface through a single, projecting contact (wear) pad, or projection, 97 (see FIG. 3B).

A top view of flexure 70 is illustrated in FIG. 3A. Conductors 72 and 74 are seen in hinge region 89 where they are separated by a gap 75. In addition to being tapered from hinge region 89 to the distal end of flexure 70, lateral edges 94a and 94b in the flexure are slightly concave—a design feature which has been found to yield improved (higher) torsional frequency characteristics.

Hinge region 89 of flexure 70 has the following preferred specifications. Conductors 72 and 74 and stiffeners 80 and 88 are type-302 (or type-304) stainless steel. The thickness of the hinge material, i.e., conductors 72 and 74, is 0.5-mils. (1 mil.=1/1000-of-an-inch). The length of the hinge is 24-mils. These dimensions were selected for the purpose of maintaining a spring constant of approximately 2.5-mgs.-per-mil. Stiffeners 80 and 88 are 1-mil. thick. Thus, most of the bending which occurs when the flexure is deflected, occurs in hinge region 89.

Figure 5A:
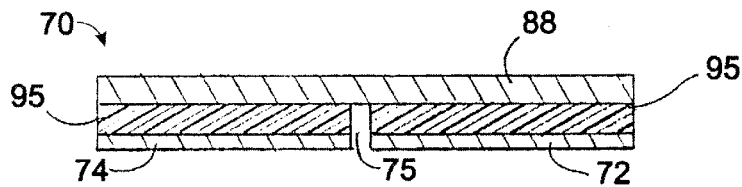
FIG. 5A is a cross-sectional view of the flexure shown in FIG. 3A.
Figure 5B:
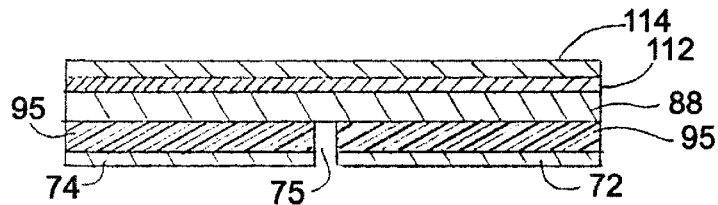
FIGS. 5B and 5C are cross-sectional views of flexures with load-bearing conductors and additional damping and constraining layers.
Figure 5C:
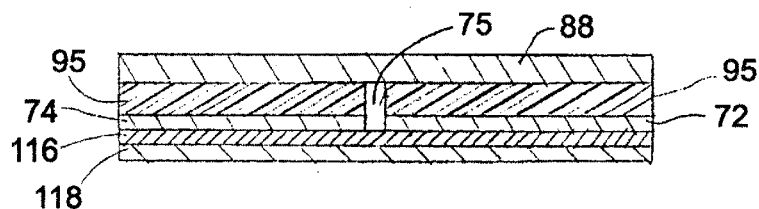

The hinge design just described provides a number of important benefits. First, a lower angular constant is achieved relative to a non-hinged design. Optimal angular constant for a simple cantilever, such as the one illustrated in FIGS. 2 and 3A, is achieved when all the bending occurs at the base (i.e., a perfect hinge). In the flexure shown in FIGS. 2 and 3A, most of the bending occurs in the base 7% of the beam. This results in an angular constant of approximately 0.19°-per-mil. of deflection. Second, the hinge provides damping capability. Since most of the flexure is rigid, constrained-layer (electrically insulating) damping material, as illustrated in FIGS. 5A, 5B and 5C (discussed in detail below), can be added to the stiffened region without affecting the spring constant. The damping material can be positioned between the conductor and stiffener layers, and/or another set of damping and constraining layers can be added above or below the flexure if necessary to attenuate vibrational amplitudes. Third, the hinge provides improved drive tolerances. If a pre-bend is added to the hinge area of the flexure, the suspension can operate essentially flat—thus requiring less mounting space. This allows very close disk-to-disk spacing. Structures, considerations and benefits relating to the concepts of pre-bent flexures and disk-to-disk spacing will be more fully developed below.

The trapezoidal/concave edge shape of the flexure, overall beam thickness, and 350-mil. free beam length provide the following advantages. First, the shape provides good lateral stiffness. Lateral stiffness increases as the cube of width. High lateral stiffness is desirable for minimizing lateral vibrational movement. Second, by tapering the width at the tip, high lateral frequencies are achieved which are desirable for servo stability. Third, the "bugle" or concave-edge shape was found to have the highest torsional frequency of trapezoidal-like shapes. High torsional frequency is desirable for servo stability because there can be a significant off-track motion associated with the torsional mode. Fourth, the design has been found to avoid undesirable modal interactions. We have discovered that certain normal modes of vibration interact with others, causing high vibrational amplitudes. Such interaction is caused by frictional changes at the transducer/disk interface with contact pad angle changes. Accordingly, the following situations should be avoided: (1) lateral frequency 1×, 2× or 3× the torsional frequency, and (2) torsional or lateral frequency of 1× or 2× any first or second bending frequency.

FIG. 3B is a side view of the distal end of flexure 70, illustrating the mounting of transducer chip 92 on flexure 70. Stiffener 88 is separated from conductor 72 by an adhesive (bonding) layer 95. Solder structures, plus adhesive and/or conductive epoxy structures in some cases, such as the solder structures shown at 96a and 96b, electrically and mechanically connect conductor 72 to chip 92. Full mechanical load is transmitted through these connections. Single pad 97 is preferably made of amorphous diamond-like carbon (DLC), and is positioned on the bottom side (in FIG. 3B) of chip 92, near the center of its trailing edge, as shown in FIG. 3C. When transducer/flexure 70 is in its operating mode, pad 97 contacts the uppermost surface of disk (medium) 98. The single-pad configuration which is employed in transducer/flexure 70 and illustrated in FIGS. 3B and 3C is characteristic of the flexures shown in FIGS. 1–9, which do not include gimbals. When a single pad is employed in a non-gimbaled flexure, facets are polished around the pad to provide full transducer signal through a range of static mounting tolerance. Other pad configurations and considerations are discussed below. Similar to the integrated transducer/flexure structure shown in FIGS. 1A and 1B, transducer chip 92, as shown in FIG. 3B, bears the entire cantilever load of the deflected beam. Thus, the need for a separate load-bearing structure is avoided.

In the configuration shown in FIG. 3B, chip 92 contains transducer pole structure and coupled coil structure organized and distributed in the following fashion. The read/write working portion of the pole structure extends within pad 97 to the bottom (in FIG. 3) disk-contacting face of the pad. The coupled coil structure occupies the generally horizontal (in FIG. 3) plane of the main body of the chip.

Shifting focus briefly onto the modification shown in FIG. 3D, here chip 92 contains pole structure and coil structure organized and distributed in a somewhat different manner. Specifically, here, both of these structures occupy a plane which extends generally normal to the long axis of flexure 70. This planar region is indicated generally at 99. Here too the read/write working portion of the pole structure extends within pad 97 to the bottom face of the pad. This organization is referred to as a "pin head" type arrangement.

The FIG. 3D embodiment suggests the possibility of creating yet another kind of transducer chip which is fully planar, and intended for suitable mounting at the end of a beam/flexure, in a disposition with its plane, including the plane of the body of the chip, normal to the long axis of the beam/flexure. Such a situation is specifically illustrated and described in a portion of this specification set forth below. In all cases the transducer is load-bearing.

The performance or flexibility of the hinge region can be modified or tuned by, for example, altering the dimensions of the conductors in the hinge region, or by changing the width of the gap between stiffeners, as illustrated in FIG. 4. Here, for example, an illustrated hinge 100 includes conductor portions 102 and 104 flanked by stiffeners 105 and 106. Flexibility of conductor portions 102 and 104 in the hinge region can be altered or tuned by changing the gap width. For example, if the hinge gap edge is relocated to line 109, then hinge flexibility is increased. Similarly, other changes in conductor geometry or material composition provide different ways of tuning the hinge.

FIG. 5A shows a cross section of flexure 70 as illustrated in FIG. 3A. Conductors 72 and 74 are separated by air gap 75, and are bound to stiffener 88 via adhesive layer 95 (a resin). Stiffener 88 and layer 95 collaboratively form joinder structure for the conductors. Importantly, resin 95 functions to insulate conductors 72 and 74 electrically from stiffener 88. Stiffening and/or vibrational damping can be enhanced by selecting an appropriate type, amount and application of the adhesive resin. Adhesive layer 95 is preferably 1.0-mil. thick. Adhesive resins which have been used to bond conductor and stiffening layers in laminant flexures of the present invention include epoxies, acrylics and polyimides in both liquid and sheet forms. For example a liquid epoxy resin available from Bondline, referred to as 6555™, can be used in the present invention. An epoxy resin in sheet form is available from AI Technology, referred to as TK7755™. An acrylic resin which can be used in the present invention is sold by DuPont under the trademark Pyralux™. A polyimide resin sold by DuPont under the name Kapton™ is another suitable alternative. Other good adhesive layer materials have been identified by Hutchinson Technology Incorporated which is located in Hutchinson, Minn.

FIGS. 5B and 5C illustrate another feature of the invention which may be employed to provide vibrational damping in addition to any damping effect which may be achieved by resin layer 95 which is sandwiched between conducting and stiffening layers. In FIG. 5B, a damping layer 112 is continuously sandwiched between stiffener 88 and a constraining layer 114, which, for example, may be stainless steel. Although it is possible to use a damping layer without a constraining layer, better results are obtained when the damping material is sandwiched between more rigid solids. This is because the damping effect relies on the absorption of shear energy in the damping layer. The amount of shear energy produced from vibrational motion of the flexure, and subsequently absorbed by the damping layer, is increased by using a constraining layer. FIG. 5C is the same as FIG. 5B except that it shows that damping layer 116 may be applied on the bottom side of the flexure, where it is sandwiched between conductors 72 and 74, and constraining layer 118. As shown in FIG. 5C, damping layer 116 spans gap 75 between conductors 72 and 74. However, it is also possible for damping layer 116 to be omitted in the region of gap 75, analogous to adhesive layer 95. Conversely, it is possible for adhesive layer 95 continuously to span gap 75 between conductors 72 and 74. A material known as ISD110™ or ISD112™, available from 3M Corporation, is suitable for damping layers 112 and 116.

Figure 6:
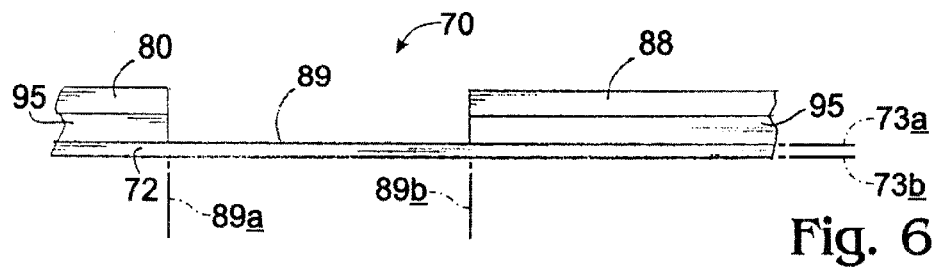
FIG. 6 is a partial side view of the flexure shown in FIG. 3A, focusing on the hinge region.

FIG. 6 shows a side view of hinge region 89 of flexure 70. Proximal stiffener 80 and distal stiffener 88 flank hinge region 89. Resin layer 95 extends continuously in the region where stiffeners 80 and 88 overlay conductors 72 and 74. Further considering some of the features which characterize hinge or hinge region 89, within the elongate body of flexure 70, the hinge region can be thought of as having longitudinal boundaries which are indicated in FIG. 6 by dash-dot lines 89a, 89b. The conductor material which makes up hinge region 89 is homogeneous (outside of these two longitudinal boundaries) only with material which lies bounded between common (shared) spaced facial planes which intersect the regions of boundaries 89a, 89b. These two common facial planes are illustrated by dash-dot lines 73a, 73b in FIG. 6. Another way of viewing this is that the material in hinge region 89 is homogeneous, beyond boundaries 89a, 89b, only with extensions of the conductor material itself which makes up the hinge region.

Figure 7:
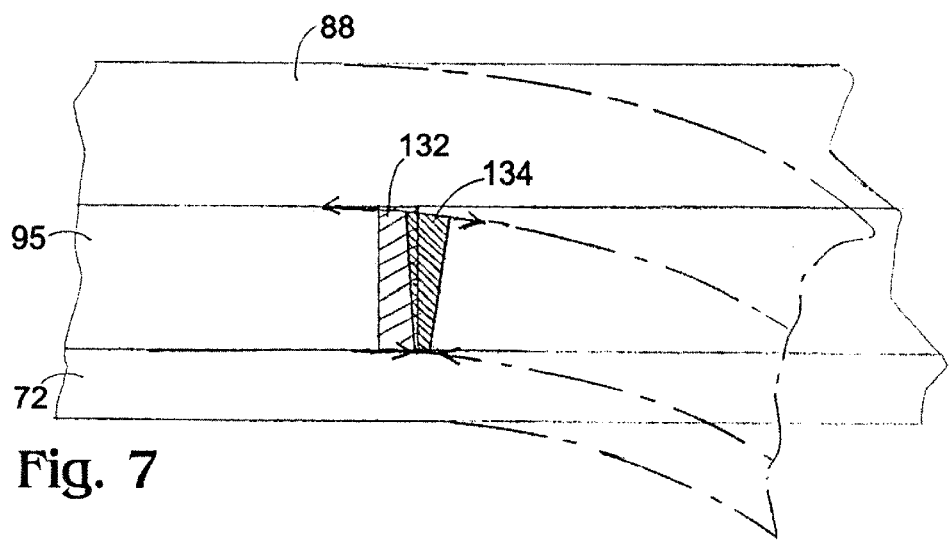
FIG. 7 is a schematic partial view of a flexed beam with an intervening adhesive resin layer.

FIG. 7 schematically illustrates change in adhesive conformation due to flexure deflection. By selecting an appropriate type of resin, and by controlling the amount used, it is possible to vary the degree of stiffening obtained in the stiffened region. The type and amount of resin 95 can also be selected to provide an advantageous vibrational damping effect. Resins typically exhibit varying degrees of elasticity. In FIG. 7, rectangular resin section 132 is stretched into trapezoidal resin section 134 when the flexure is bent. A greater degree of stiffening is therefore achieved by selecting a resin which is relatively unyielding or resistant to stretching.

Figure 8:
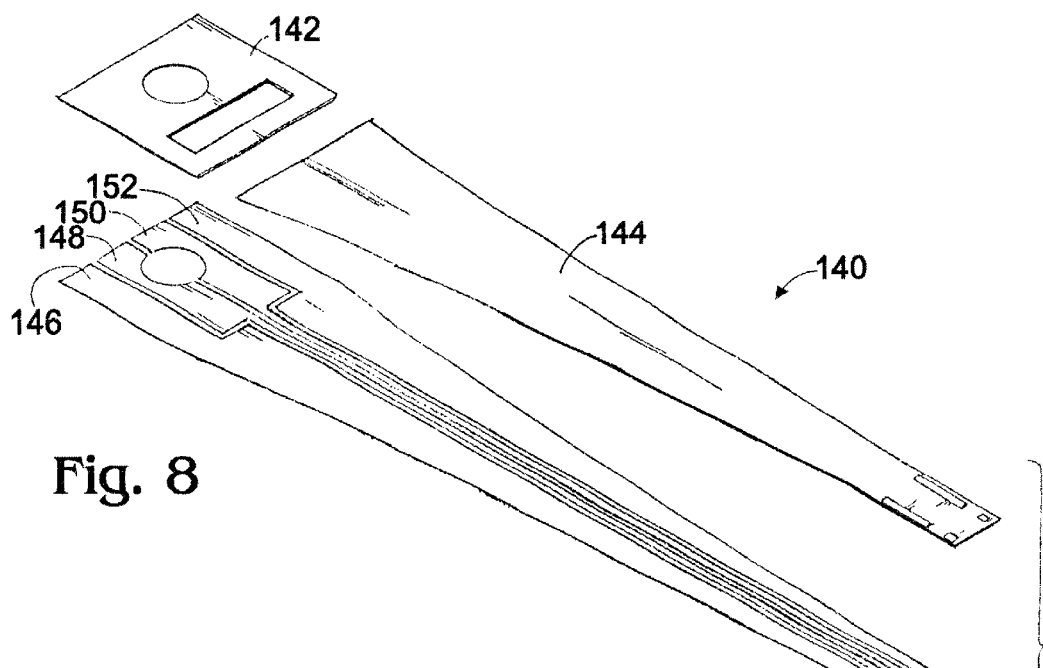
FIG. 8 is an exploded perspective view of a transducer/flexure with four conductors, and a hinge near the proximal end of the flexure.
Figure 9:
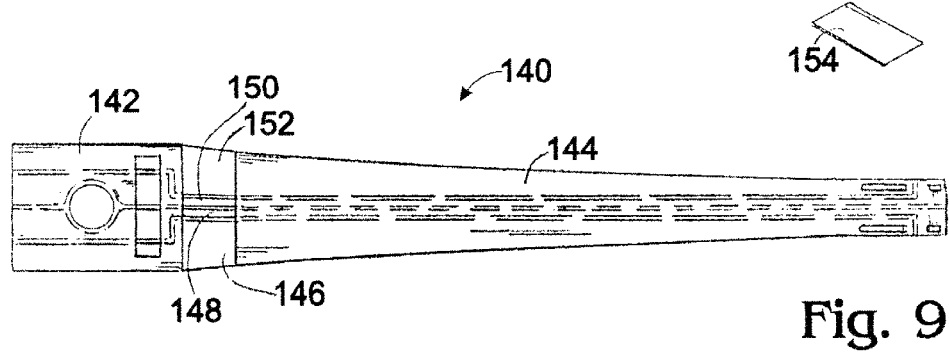
FIG. 9 is a top view of the transducer/flexure shown in FIG. 8, assembled. Conductor boundaries, which are covered by stiffeners, are indicated by dashed lines.

FIGS. 8 and 9 illustrate views of a modified flexure, which in many respects is the same as the flexure shown in FIGS. 2 and 3A. An important difference, however, is that in the flexure shown in FIGS. 8 and 9, four conductors are provided in the conductive layer. It is sometimes necessary to provide more than two conductors to the distal end of the flexure. For example, in transducer/flexure structures which include a magnetoresistive read substructure, at least four conductors are required. FIGS. 8 and 9 illustrate that the concept of the present invention, characterized by multiple load-bearing conductors, may encompass designs which include many more than two conductors, even though most of the flexures specifically described in this application include only two load-bearing conductors.

In FIG. 8, a flexure 140 includes a stiffener 142 and a stiffener 144 overlaying load-bearing conductors 146, 148, 150 and 152. As in the previously described design, although not shown in FIG. 8, the stiffeners are bound to the conductors by an insulative adhesive resin. Transducer chip 154 is directly bonded to the bottom side of conductors 146, 148, 150 and 152, substantially as shown in FIG. 3B. A single wear pad is provided on the bottom side of chip 154 near the center of its trailing edge. FIG. 9 shows the outline of the conductors in dashed lines. Note that in this structure, the conductors are distributed symmetrically with respect to an imaginary plane which bisects the flexure along its length.

Turning attention now away from non-gimbaled structures made in accordance with the teachings of this invention toward gimbaled structures, it is important to note that gimbaled-type structures are fundamentally different from the flexure/transducer structures which have been described so far above. They are different in that gimbal mechanism allows the transducer chip ranges of pitch and roll motion independent from the supporting flexure body. Gimbaling movement of a transducer chip has been recognized as an extremely important mechanical feature with respect both to flying structures and to contact-capable structures. In the non-gimbaled flexures described above, the conductors have been characterized as "load-bearing" structures because of the relative size and configuration in a proximal hinge region and throughout the body or length of the flexure. In the descriptions which now immediately follow, gimbal flexures are described in which the conductors fulfill additional mechanical load-bearing and articulating functions, such as hinge and torsional flexibility for a distally-located gimbal which permits pitch and roll movement of the transducer chip relative to the flexure body. These gimbaled configurations are illustrated collectively in FIGS. 13-30, inclusive, and in each of the designs therein illustrated, the conductors contribute functionally in at least three important ways: (1) to conduct electrical signals between a transducer and external circuitry; (2) to bear all or a portion of the deflected cantilever load, at least at some point along the length of the flexure; and (3) to provide a gimbal platform (a transducer-carrying platform) for mounting a transducer chip. Accordingly, the embodiments that are shown in the collection of figures just mentioned are referred to as "conductor gimbaling flexures".

A further matter to note is that in all of the flexure/transducer structures which are described and discussed in this specification, there exists, fundamentally, a three-layer flexure structure to which there is attached or joined, in various ways, a transducer chip. The three layers in each flexure structure include a conductor layer, an adhesive layer, and a stiffener layer, and in each of these layers, and in the different embodiments, the specific configurations of the components in the layer are somewhat different. Relying on the fact that all now-to-be-described flexure/transducer assemblies have, in many respects, similar organizational characteristics, descriptions of these embodiments will be presented in a more conversational flow of structural and functional qualities, rather than with a mechanistic listing of parts followed by a functional description, and with an effort to focus principally, and inter alia, on key differences that differentiate the different embodiments.

Figure 10:
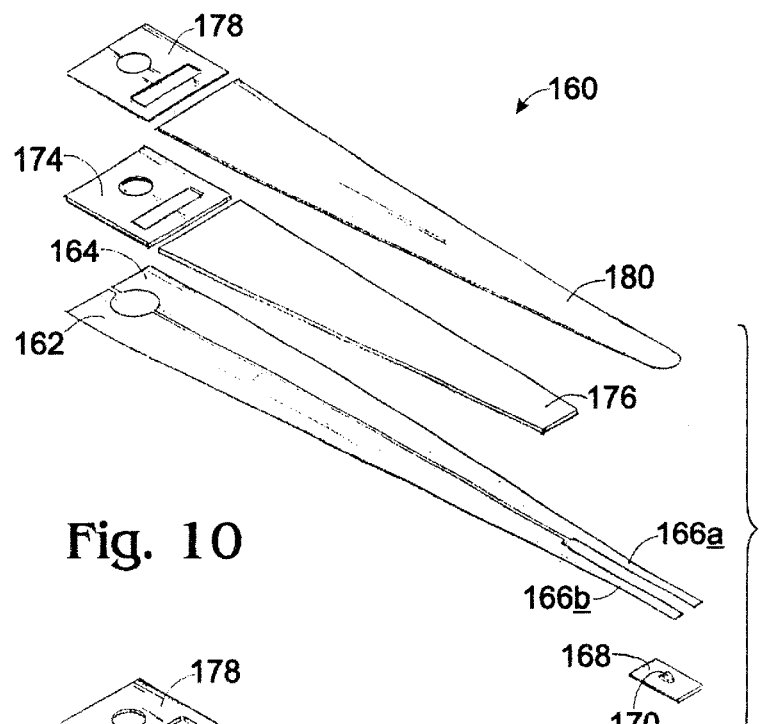
FIG. 10 is an exploded perspective view of a transducer/flexure with load-bearing conductors and a load-button gimbal.
Figure 11:
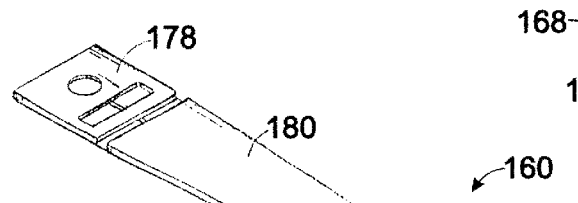
FIG. 11 is a perspective view of the transducer/flexure shown in FIG. 10, assembled except for mounting of the chip (transducer).
Figure 12A:
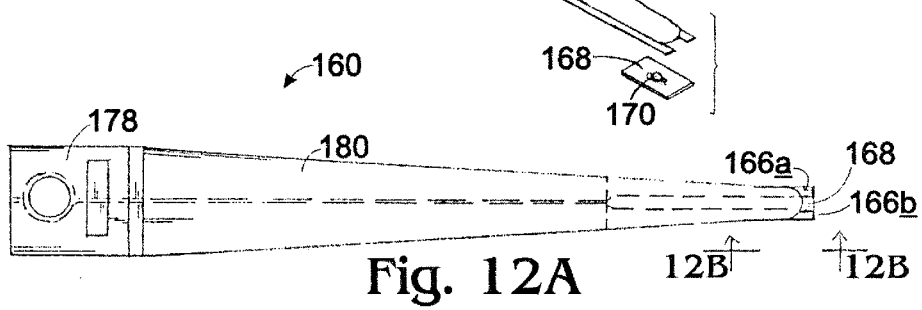
FIG. 12A is a top view of the transducer/flexure shown in FIGS. 10 and 11. Conductor boundaries, which are covered by stiffeners, are indicated by dashed lines.

Thus, and turning attention first of all now to FIGS. 10, 11, 12A, 12B and 12C, here there is illustrated an embodiment of the invention which employs what is referred to as a "load-button" gimbal. This embodiment closely resembles a head/flexure design previously disclosed and claimed in co-pending U.S. application Ser. No. 07/783,619. Here a transducer/flexure 160 is principally supported by load-bearing conductors 162 and 164. At the distal end of conductors 162 and 164 are articulator "ribbons" 166a and 166b on which a transducer chip 168 is mounted. A load button 170 is provided on the top side of chip 168 around which rocking, inclinational movement of the chip is allowed. It is important to note, however, that the load button could also be provided on the bottom side of stiffener 180 for example, by creating a downwardly protruding dimple. The height of load button 170 is approximately equal to the thickness (0.5-mils) of conductors 162 and 164 plus the thickness of adhesive layers 174 and 176. Adhesive layers 174 and 176 facilitate lamination of stiffeners 178 and 180 on top of conductors 162 and 164. FIG. 11 shows assembled flexure 160 with detached transducer chip 168. FIG. 12A shows the top view of assembled flexure 160.

Figure 12B:
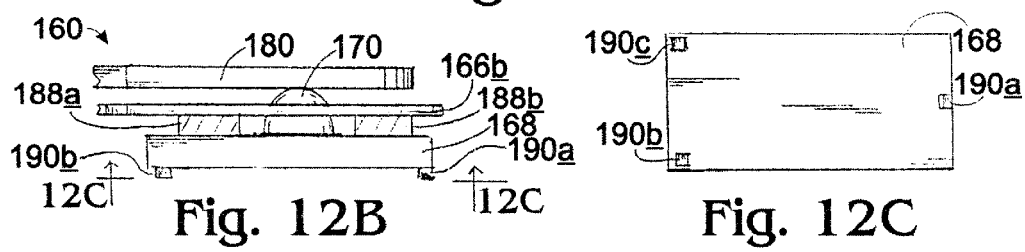
FIG. 12B is a partial side view of the distal end of the flexure shown in FIG. 12A.
Figure 12C:
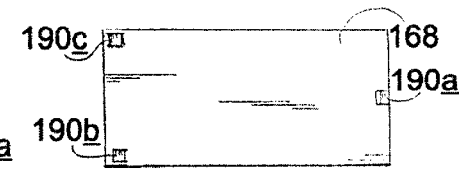
FIG. 12C is a bottom view of the transducer shown in FIG. 12B.

FIG. 12B illustrates the mounting configuration of transducer 168 on flexure 160. In the region of flexure 160 where transducer 168 is attached, stiffener 180 is separated from conductor ribbon 166b by air. As shown in FIG. 10, adhesive layer 176 only extends distally to the point where ribbons 166a and 166b begin. Transducer 168 is bonded by solder structure 188a and 188b to conductor ribbon 166b. The bottom side of transducer 168 has three wear pads 190a, 190b and 190c (see particularly FIG. 12C) which contact the disk surface in a triangular (tripodic) pattern when the transducer is operating. Ideally, sufficient load is applied to flexure to maintain contact between each of the pads and the disk surface at all times.

In FIG. 13, flexure 200 includes conductors 202 and 204 which are spaced apart from each other and extend along the entire length of flexure 200. A gimbal structure or region 206 of the conductors is located near the distal ends of the conductors. Each conductor contributes one of a pair of parallel platforms (or articulated portions) 208a and 208b which are located centrally within a cut-out gimbal region and serve collectively as a mounting platform for transducer chip 210. This mounting platform is located adjacent what is also referred to herein as the transducer unit receiving end of flexure 200. Platforms 208a, 208b are also referred to as paddle portions. Stiffeners 212 and 214 are laminated, via adhesive as previously described, onto the tops of conductors 202 and 204 on opposite sides of gap 213 which defines a hinge region. The stiffeners rigidify portions of conductors 202 and 204 outside of hinge region 213. Additionally, the stiffeners' continuity from side-to-side provides structural compliance between the two load-bearing conductors 202 and 204. In gimbal region 218 toward the distal end of stiffener 214, two additional stiffeners 220 and 222 are laminated above the gimbal region 206 of conductors 202 and 204. Stiffeners 220 and 222 serve to coordinate corresponding conductor regions and to isolate mechanical articulating conductors, i.e., conductive torsional beams, which will be shown and discussed in more detail below.

FIG. 14 shows a magnified top view of gimbal region 206 of conductors 202 and 204. Conductors 202 and 204 are distinctively shaded to assist the viewer in understanding the mechanical relationship and electrical isolation of the conductors. Platforms 208a and 208b are coordinated and jointly stiffened on the top side by stiffener 222. On the bottom side of platforms 208a and 208b, transducer chip 210 is attached. It is apparent that platforms 208a and 208b also function as electrically distinct leads to transducer 210. Torsional beams (articulators, units, elements) 230a and 230b allow platforms 208a and 208b a limited range of pitch flexibility. Similarly, torsional beams (articulators, units, elements) 232a and 232b allow platforms 208a and 208b a limited range of roll flexibility. Beams 230a 230b, 232a, 232b, collectively, constitute articulator structure which is referred to herein as being characterized by mechanical and electrical homogeneity —i.e., merged functionality. The gimbaling motion permitted by the torsional beams makes possible accommodation of angular or topographic irregularities on the surface of a rigid medium. Although the surface of a medium is ideally flat, in reality, irregularities due to, for example, micro-roughness, polishing/texturing scratches, disk waviness and/or "cupping", non-parallelism of the spindle and actuator axes, and non-squareness of either of these axes and the disk surface, are inherently present to some degree. The torsional beams also permit the head/flexure to accommodate static mounting tolerances.

FIG. 15A shows a top view of the flexure shown in FIG. 13, after assembly. In FIG. 15A portions of conductors 202 and 204 can be seen in hinge region 244 and through window 242 which allows electrical bonding through the top side of flexure 200. Stiffener 212 also has hole 240 concentrically located above conductor hole 241. Holes 240 and 241 are used for positioning the suspension on a mounting surface. Near the distal end of flexure 200, gaps between stiffeners 220 and 222 define flexible torsional beam portions of conductors 202 and 204.

An important feature of all the gimbaled flexures described in this application is the configuration of pads (the three contact pads) located on the bottom side of the transducer chip for contacting the surface of the recording medium during read/write operation. Unlike the non-gimbaled flexures, a fundamental objective in the gimbaled designs is to maintain a parallel relationship (zero-angle-of-attack) between the plane of the transducer chip and the surface of the recording medium. For this purpose, a load force is applied, via the deflected flexure, urging the transducer chip into load-bearing contact with the disk's surface. Multiple pad contact points on the bottom of the transducer chip define a plane of interfacial contact between the chip and the disk. Ideally, torsional beams and/or hinges, load buttons, etc. permit the interfacial contact plane between the disk and the pads to remain intact, despite mounting tolerances and disk surface aberrations, throughout normal read/write system operation. The most common pad configuration employed in the gimbaling flexures of the present invention, consists of a triangular arrangement of three pads, one located in the center of the trailing (or distal) edge of the transducer chip, and the other two pads being located at opposite front corners of the chip. The pole, which is contained typically in the trailing pad, is preferably in constant contact with the surface of the media for the most high-level read/write performance. While this is a typical arrangement, a reverse kind of arrangement is possible, and may offer certain performance advantages in selected applications. More particularly, the central, pole-containing pad could be located adjacent the leading edge of the chip. With this type of arrangement, relative motion between the chip and disk tends to drive the leading-edge pole-containing pad into even more intimate working confrontation to the recording surface in a medium. Further, it is possible that pole structures might be provided in two, or in all three, of the pads.

Maximum stability is achieved when the pads are located as far apart as possible, consistent with chip size and disk flatness constraints. During pad-disk contact, the pads may be perturbed in the Z direction by hitting pits or asperities in the surface. When this occurs, the downward load must be great enough to restore contact quickly between the pads and the disk. Pad size and shape is not critical except that it is desirable to have the pad that contains the pole be as small as possible to minimize spacing loss, inasmuch as the actual contact point on the pad varies due to disk waviness. For wear reasons, it may be desirable to have larger pads which can sustain larger removed wear volumes. Pads that become too large may create an air-bearing surface that causes a contact-intended transducer to fly rather than to slide. In addition, larger pads may exhibit higher adhesion forces, and consequently additional friction and stiction during operation. Round pads may be desirable so that debris will not collect on a flat leading edge, as has been observed in some cases on square or rectangular pads.

FIGS. 15B and 15C illustrate the pad configuration used on the bottom side of transducer chip 210. Stiffener 214 is laminated, via adhesive 247, to conductor 202. Conductor 202 is electrically and mechanically attached to the top side of transducer chip 210 by load-bearing solder structures 248a and 248b. The chip may also be attached to the conductors by processes employing brazing or conductive epoxy materials. As shown in FIG. 15C, pads 250a, 250b and 250c are arranged in a maximally separated triangular configuration on the bottom side of transducer chip 210.

A large number of possible pad configurations may be employed in the gimbal structures of the present invention. It is generally preferred to use not more than three pads because four or more contact points create the possibility for rocking of the chip on the disk surface. It is possible for all three pads to be directly connected to the transducer chip, or alternatively, as described in detail below, one or more of the pads may be located on other parts of the flexure which articulate relative to the transducer-carrying portion of the flexure. In most of the gimbal structures described in this application, the pole-containing pad is located on the trailing edge of the chip body. However, as shown by arrow 250d, in FIG. 15C, and as was mentioned earlier, it is possible, and sometimes preferable, to position the pole-containing pad on the leading edge of the chip (by rotating the chip 180°, or by reversing the direction of disk rotation). We have discovered that the pad(s) which is positioned on the leading edge of the chip experiences a significant amount of friction with the disk surface, causing an unloading affect on the pad or pads located on the trailing edge of the chip. This phenomenon must be taken into account when deciding where to position pitch articulators in a gimbal. Further, we have found that electromagnetic signal performance can vary significantly depending on whether the pole-containing pad is on the leading edge or on the trailing edge of the chip body. In general, we have observed a significant increase in signal magnitude when the pole is positioned on the leading edge (instead of on the trailing edge) of the chip.

In a tri-pad arrangement of the type shown in FIG. 15C, where the transducer chip is mounted on a gimbal permitting all three pads to contact the surface of the medium continuously during normal operation, the transducer chip remains in a substantially parallel orientation, i.e., at a zero-angle-of-attack, relative to the surface of a disk. This feature of the disclosed gimbal structures, represents a major departure from prior transducers/flexures which exhibit substantial angles-of-attack relative to a disk's surface. Positioning the transducer chip to operate at a zero-angle-of-attack relative to the disk surface provides the capability of employing a transducer design which, due to a particular coil structure, requires the main pole structure to be located inward from the transducer chip's trailing edge.

Figure 15D:
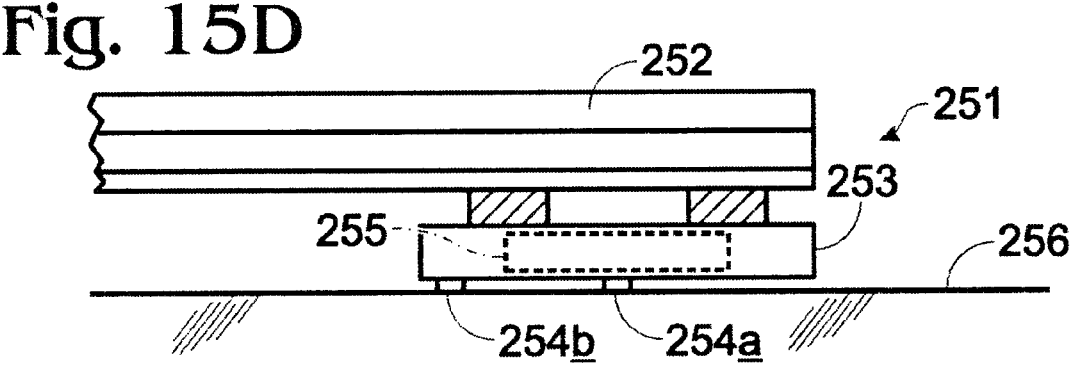
FIG. 15D is a partial side view of the distal end of a gimbaled transducer/flexure with a modified transducer and pad configuration.
Figure 15E:
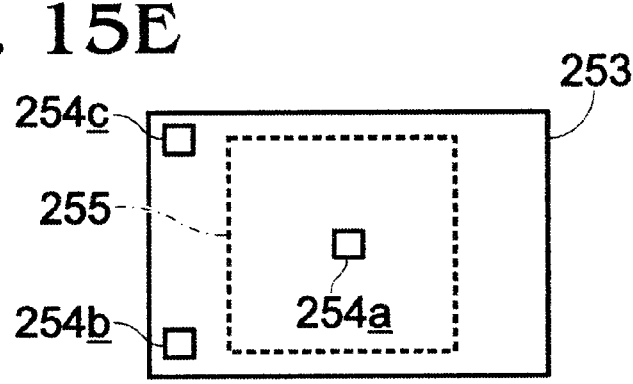
FIG. 15E is a bottom view of the transducer shown in FIG. 15D.

For example, as illustrated in FIGS. 15D and 15E, it is sometimes desirable to locate a pad containing the main pole, inward from the trailing edge of the chip. Flexure/transducer 251 is supported by beam 252. Transducer chip, or chip body, 253, which is generally quite thin and planar, is mounted on the bottom side of beam 252. Projecting tri-pads 254a, 254b and 254c are located on the bottom side of body 253, defining a plane of interfacial contact between the transducer and the disk's surface 256. Inductively coupled to the pole structure is a generally planarly distributed coil, or coil structure, which lies in the plane of chip body 253 in a coil region 255 generally designated by dashed lines in body 253. As shown, it is sometimes desirable to employ a coil design which extends forward and backward from pole 254a along the Y axis. In such a design, it is necessary to position the pole-containing pad inward from the trailing edge of the chip. This design goal is problematic, i.e., sometimes impossible, in a flexure/transducer which positions the chip with a significant angle-of-attack relative to a disk's surface. This is because, as the pole is moved inward from the trailing edge of a chip body, which is oriented with a significant angle-of-attack, it becomes impossible for the pole to contact the disk. The distance between the pole and the disk becomes greater and greater as the distance between the pole and the trailing edge increases. Accordingly, the flexibility for implementing alternative pole and coil designs in transducers which operate at a significant angle-of-attack is quite limited. It is important to note that the positioning of pitch and roll articulators in a given gimbal configuration is primarily determined by the locations of the contact pads. For example, as the pole-containing pad is moved inward from the trailing edge of the chip body, pitch articulators in the gimbal must also be moved in the same direction in order to maintain the desired gimbal performance and load allocation among the pads.

In contrast, by providing a flexure/gimbal structure, which is capable of supporting a transducer chip in parallel orientation (zero-angle-of-attack) relative to a disk's surface, a great improvement in transducer design flexibility is made possible. In the flexure/gimbal structures of the present invention, the pole-containing pad may be located practically anywhere on the working side or surface of the chip without altering the operable spacing (or contact relationship) between the pole and the disk surface. The entire planar body of the transducer chip is available for containing coupled pole structure and coil structure.

FIG. 16 is a thin-layer section including the pitch-accommodating torsional beams of the flexure shown in FIG. 15. The structures of torsional beams 230a and 230b are analogous to conductor hinge 89 in FIG. 6.

Figure 17A:
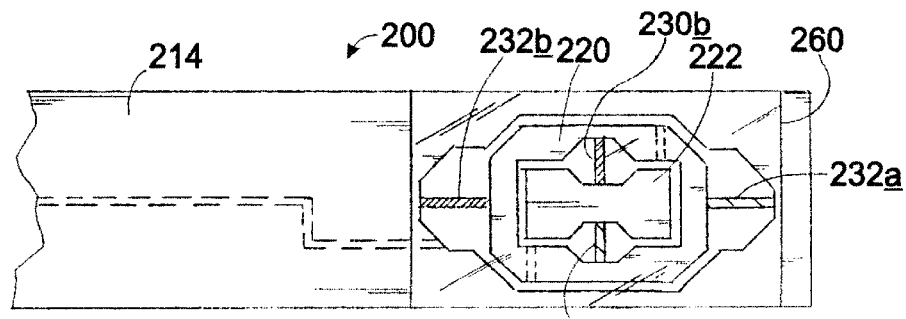
FIG. 17A is a partial top view of the distal end of the transducer/flexure shown in FIG. 15A, with the addition of a membrane damping layer in the vicinity of the gimbal.
Figure 17B:
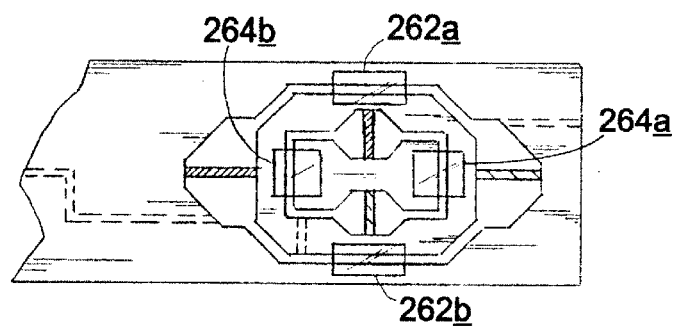
FIG. 17B is the same as FIG. 17A except the damping layer is localized over four discrete regions of the gimbal.

FIGS. 17A and 17B illustrate a portion of a conductor gimbaling flexure which in all respects is the same as the flexure shown in FIGS. 13–16, except that an additional damping layer is added. In FIG. 17A, damping layer 260 covers substantially the entire gimbal. Damping layer 260 may be, for example, an elastomer available from 3M under the trademark ISD110™ or ISD112™. The material is preferably diluted with ethylacetate to 10% (V/V) of its original concentration, and then applied to the top of the flexure in the gimbal region as shown in FIG. 17A. Use of such a membrane layer results in significant vibrational damping. It is believed that shear energy is absorbed by the membrane, particularly in regions of the gimbal where the maximum amount of vibrational movement is expected to occur. A thin membrane can be employed for this purpose without significantly stiffening the pitch and roll motions otherwise permitted by the gimbal. However, to minimize further any stiffening effect of the membrane on the gimbal, and as is shown in FIG. 17B, a modified damping membrane configuration includes four discrete membranes, or membrane patches, 262a, 262b, 264a and 264b, each of which bridges two separate conductor portions in an area where the greatest degree of relative movement between the portions is expected to occur. It is preferable to select a damping material which exhibits a relatively high degree of elasticity under static conditions, and a high degree of stiffness when subjected to a high-frequency condition.

Another desirable way of employing a damping membrane, such as the ones illustrated in FIGS. 17A and 17B, is to position the damping membrane between either stiffener and conductor, or the flexure and an additional constraining layer. Ideally, the adhesive layer, which is already required in each of the laminant flexures described herein, and which can furnish damping action, may extend continuously through the gimbal region. The adhesive layer may extend through all of the gaps between stiffeners 214, 220 and 222 in the gimbal region. Alternatively, and in order to minimize any stiffening effect of the membrane on the gimbal, the adhesive layer may bridge gaps between stiffeners only in discrete regions where maximum movement between the stiffeners is expected to occur, similar to the configuration shown in FIG. 17B.

Figure 18:
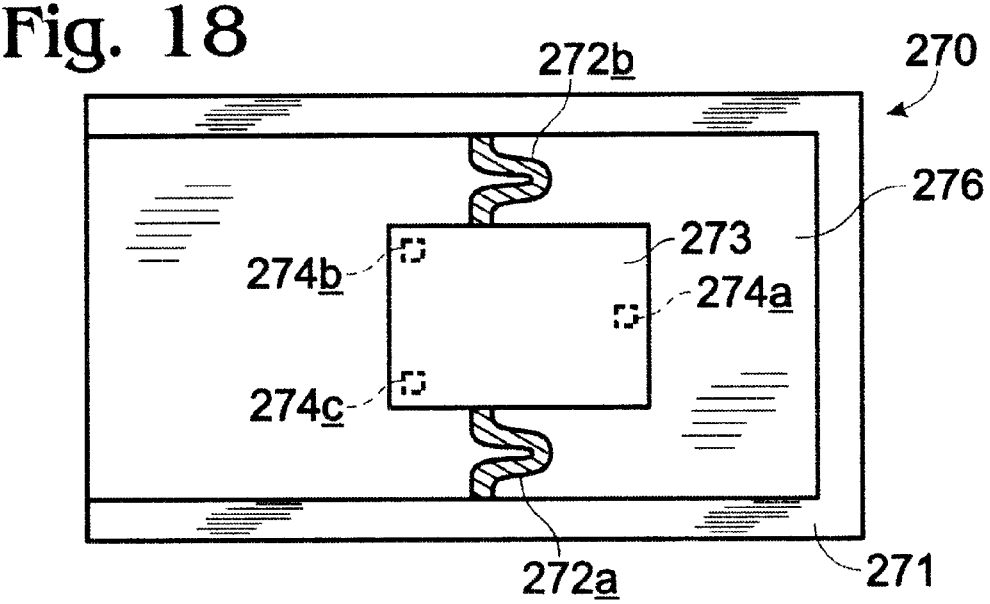
FIG. 18 is a partial top view of the distal end of a transducer/flexure with a membrane which functions primarily as a gimbal structure.

FIG. 18 shows another embodiment of a gimbaled transducer/flexure which employs a membrane interconnecting a flexure body and a transducer chip. In the structure shown in FIG. 18, the membrane functions primarily as a gimbaling structure and possibly also a damping layer. Transducer/flexure 270 includes a flexure frame portion 271 from which trace conductors 272a and 272b extend to transducer chip 273. Three contact pads 274a, 274b and 274c (dashed lines) are located on the bottom (working) side of transducer chip 273. The transducer pole (not shown) is preferably located in contact pad 274a. In this design, trace conductors 272a and 272b are downsized (compared to previously described conductors) and shaped (folded or curved) so as to make the conductors insignificant structural contributors in the transducer/gimbal region. Elastomeric membrane 276 spans the gap region between flexure frame portion 271 and transducer chip 273. As already described with reference to FIGS. 17A and 17B, a membrane interconnecting a flexure frame and a transducer chip can be employed advantageously for the purpose of damping vibrations. However, the primary function performed by membrane 276 is to bear the cantilever load while permitting ranges of pitch and roll movement of transducer chip 273. Membrane layer 276 is the only significant load-bearing connection between frame portion 271 and transducer chip 273. By selecting the appropriate type, thickness and configuration, membrane 276 may function as a gimbal structure to allow pitch and roll movement of transducer chip 273 independent from flexure frame portion 271, while possibly also damping vibrations. Membrane 276 is preferably sandwiched between flexure frame subportions and/or conductors.

Figure 19A:
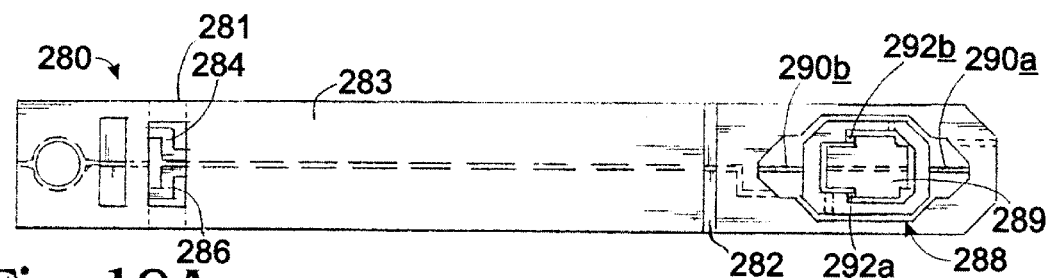
FIG. 19A is a top view of a transducer/flexure with load-bearing conductors, two hinges and a modified gimbal.
Figure 19B:
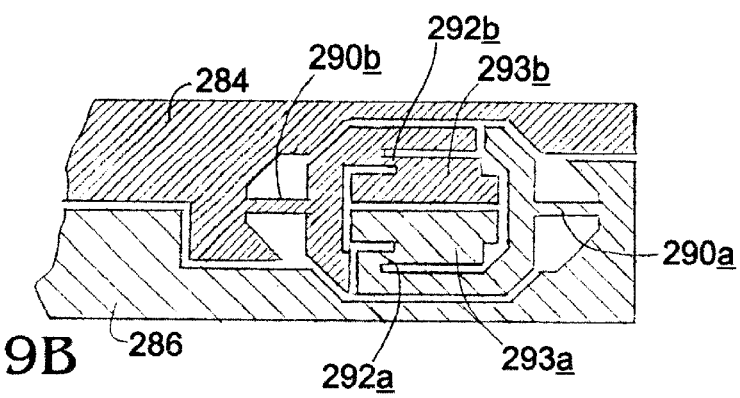
FIG. 19B is a partial top view of the distal ends of the conductors in the transducer/flexure shown in FIG. 19A.
Figure 20:
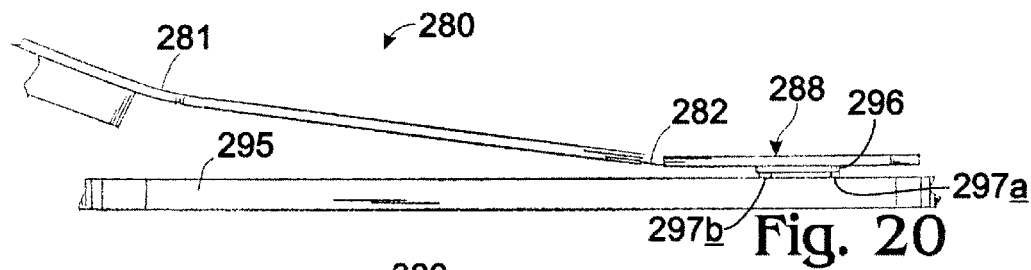
FIG. 20 is a side view of the transducer/flexure shown in FIG. 19A, operating on a disk.

FIGS. 19A, 19B and 20 illustrate a flexure which is similar to the one illustrated in FIGS. 13–16 except for several important differences. As shown in FIG. 19A, flexure 280 has two hinges 281 and 282. Hinge 281 is characterized by a cut-out window in stiffener 283 near its proximal end exposing relatively thin conductors 284 and 286. The outlines of conductors 284 and 286 underneath the stiffeners are shown in dashed lines. It is apparent that, although the reduced dimensions of conductors 284 and 286 in the proximal hinge region (relative to the dimensions of previously described conductors) diminishes the load-bearing function of the conductors in that region, in the intermediate region of the flexure the conductors are wider, and therefore carry a significant portion of the load. The configuration of modified hinge 280 results in a higher spring constant for accommodating higher loads in comparison to the loads carried by previously described flexures.

The configuration of hinge 282 near the distal end of the flexure is similar to previously described hinges in that conductors 284 and 286 are the sole load-bearing structures in that region. Gimbal 288 allows pitch and roll movement of stiffened transducer-carrying platform 289. Similar to the gimbal shown in FIGS. 13–15, gimbal 288 employs torsional beams 290a and 290b to allow roll movement of platform 289 independent from the body of flexure 280. Pitch movement is facilitated by hinges (articulators, units, elements) 292a and 292b which are rearwardly displaced from the center of the platform in order to equalize load distribution among the three medium-contacting pads (not shown). The use of hinges instead of torsional beams provides the important advantage of increased longitudinal and yaw stiffness. Another advantage of using hinges to provide pitch movement instead of torsional beams is that overall width of the flexure in the gimbal region can be reduced. The pitch-permissive hinges also provide a platform for dispensing adhesive. The configuration of conductors 284 and 286 in gimbal region 288 of flexure 280 is shown in FIG. 19B. Conductor 286 enters the gimbal mechanism through roll-permissive torsional beam 290a, and enters the transducer-carrying region through pitch-permissive conductor/hinge 292a to end in transducer-carrying semi-platform 293a. Similarly, conductor 284 enters the gimbal mechanism through roll-permissive torsional beam 290b, and enters the transducer-carrying region through pitch-permissive conductor hinge 292b to end in transducer-carrying semi-platform 293b.

FIG. 20 shows a side view of flexure 280 operating on disk 295. Most of the bending which results from deflection of the flexure occurs in hinges 281 and 282. Gimbal 288 mounts and supports transducer chip 296. A "tri-pad" configuration (only two pads 297a and 297b are shown), as previously described, exists for maintaining an interfacial contact plane between chip 296 and the surface of disk 295.

Figure 21:
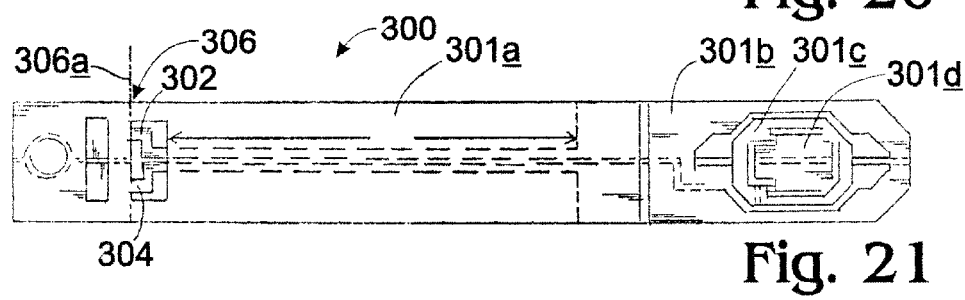
FIG. 21 is a top view of a transducer/flexure, similar to the one shown in FIG. 19A, except that conductor dimensions are modified.
Figure 22A:
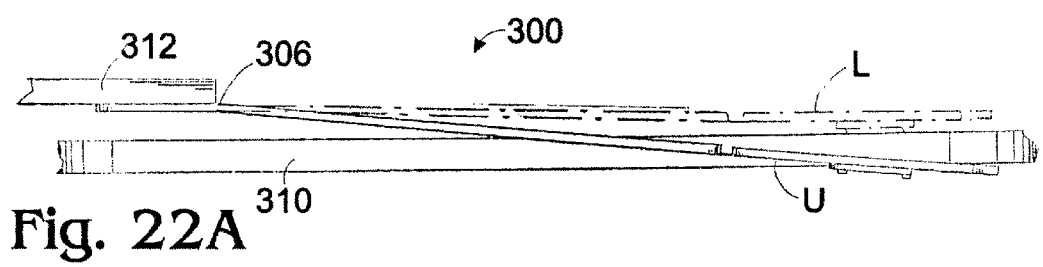
FIG. 22A is a side view of the transducer/flexure shown in FIG. 21, with a pre-bend near the proximal end of the flexure. The flexure is shown in its pre-loaded position (solid lines) and in its operating or loaded-position (dash-dot lines).

Flexure 300, as shown in FIG. 21, is the same as flexure 280 shown in FIG. 19, except that the dimensions of conductors 302 and 304 in region I are modified, and that flexure 300 is pre-bent in proximal hinge region 306 (FIG. 22A). This prebend exists along an axis 306a (see FIG. 21) which defines a preferential bending axis for flexure 360.

Stiffener layers 301a, 301b, 301c and 301d are laminated on top of conductors 302 and 304. The lateral dimensions of conductors 302 and 304 in region I are shown in dashed lines because the conductors are covered by stiffener 301a. The reduction of conductor width in region I can result in a significant reduction in capacitance levels.

The conductors can be made of different materials. However, a number of factors must be considered when selecting an appropriate conductor material. In addition to being able to conduct electricity, the conductor material must exhibit appropriate physical/mechanical properties within the geometric and dimensional limitations which dictate the operation and overall size of the flexure. When the conductors function as the only load-bearing components of the proximal hinge, as in previously described designs, it is preferable to use materials, such as stainless steel, which have a relatively high elastic (Young's) modulus resulting in higher modal frequencies, and high tensible strength which can therefore support higher loads. However, in flexures such as the ones shown in FIGS. 19–22B, where the conductors are relatively insignificant load-bearing components in the proximal hinge, beryllium copper is a suitable choice of material. With some conductor materials, such as stainless steel, it is preferable to gold-plate the entire surface for at least two reasons. First, gold-plating in the bonding regions facilitates a solder connection. Second, gold-plating the entire stainless steel beam reduces resistance. When beryllium copper is used as the conductor material, it is only necessary to gold-plate the bonding regions.

FIG. 22A shows flexure 300 in its unloaded position U (solid lines) and in its loaded position L (dash-dot lines) relative to disk 310. By pre-bending flexure 300 in hinge region 306 (on axis 306a), flexure mount 312 can be parallel to the disk surface, thereby, minimizing disk-to-disk spacing.

Figure 22B:
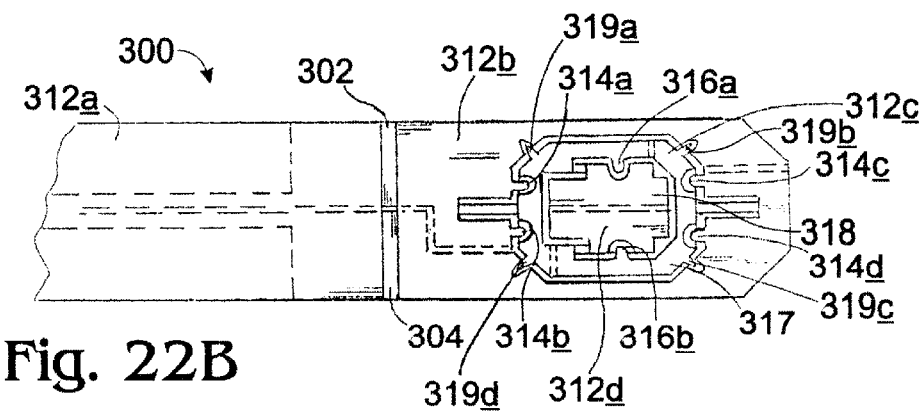
FIG. 22B is a partial top view of a flexure which is similar to the flexure shown in FIG. 21, except that it employs a modified gimbal.

FIG. 22B illustrates a modification of flexure 300 which involves the use of gimbal-motion-limiting guides, or "bumpers", for the purpose of avoiding extreme, potentially catastrophic movement of gimbal parts out of the plane of flexure 300 in the case of a relatively high-shock situation. Read/write systems are sometimes subjected to high-shock forces, for example, when a system is dropped or moved abruptly. In this situation, gimbal parts which are connected by relatively small hinges or torsional beams, may be moved, bent or broken permanently away from their operable positions. Accordingly, the modification of flexure 300 shown in FIG. 22B, provides motion-limiting bumpers for preventing extreme movement of the gimbal parts with respect to the flexure body and to each other. In FIG. 22B, flexure 300 includes conductors 302 and 304, the configuration of which has already been discussed referring to FIGS. 19A through 22A. Stiffeners 312a, 312b, 312c and 312d are laminated on top of conductors 302 and 304. Stiffeners 312h, 312c and 312d differ from previously described stiffeners in that they include tabs which extend over air gaps between gimbal parts. These tabs partially cover (but do not touch) exposed conductor regions in an adjacent gimbal part. For example, tabs 314a, 314b, 314c and 314d extend over conductor edge regions of gimbal part 317. Bumpers 314a, 314b, 314c and 314d significantly limit the extent to which gimbal part 317 can move above the plane of flexure 300 in a high-shock situation, while still allowing the desired range of roll torsional movement of the transducer chip independent from the body of flexure 300. Similarly, tabs 316a and 316b are extensions of stiffener 312c, protruding over conductor edge regions of transducer-carrying platform 318. Bumpers, or tabs, 316a and 316b prevent extreme movement of platform 318 above the plane of gimbal part 317 or the body of flexure 300, while still allowing the desired degree of pitch movement of platform 318 independent from the rest of flexure 300. Extreme movement of the gimbal parts below the body of flexure 300, can also be prevented by outwardly extending tabs 319a, 319b, 319c and 319d. Each of tabs 319a, 319b, 319c 319d extend over a gap separating gimbal part 317 from the body of flexure 300, and over an exposed conductor region defined by corresponding cut-outs in stiffener 312b. It is apparent (although not shown) that similar outwardly extending tabs could be employed to limit extreme movement of platform 318 below the plane of gimbal part 317.

Figure 23:
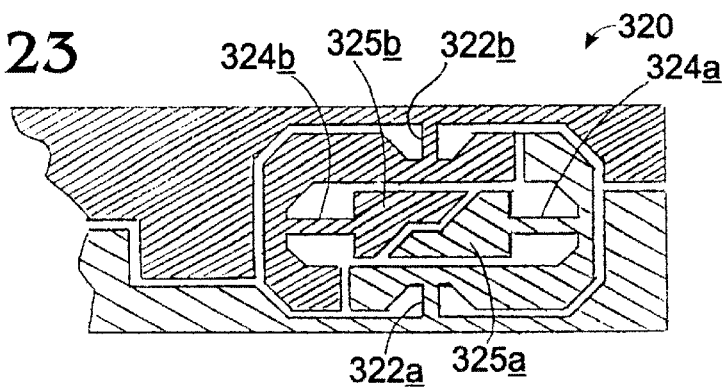
FIGS. 23–25 are top views of modified two-conductor gimbaling structures.
Figure 24:
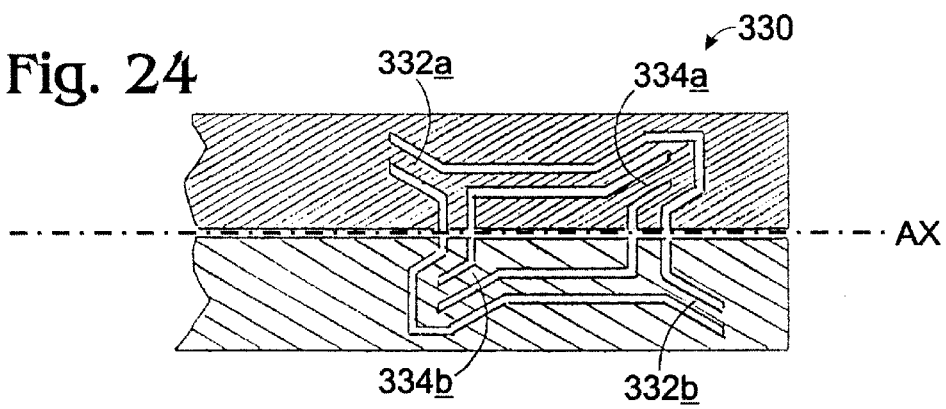
Figure 25:
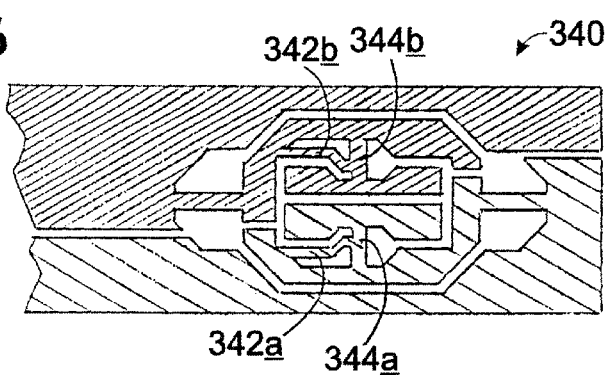

FIGS. 23–25 illustrate modified conductor gimbal configurations employing conducting articulators, namely, torsional beams, to allow limited ranges of pitch and roll movement of a transducer platform independent from a flexure body. Each of the gimbaling conductor structures shown in FIGS. 23–25 can be implemented, with corresponding stiffeners, in flexures such as the ones shown in FIGS. 13–22B. Specifically, the gimbaling conductor structure shown in FIG. 14 could be replaced (along with appropriately modified stiffeners) with any one of the structures shown in FIGS. 23–25.

In FIG. 23, gimbaling conductor configuration 320 is similar to the one shown in FIG. 14, except that pitch-permissive torsional beams 322a and 322b are located laterally and externally from roll-permissive torsional beams 324a and 324b. In contrast to the FIG. 14 configuration, where pitch-permissive torsional beams 230a and 230b connect directly to transducer-carrying platforms 208a and 208b, in the FIG. 23 configuration, roll-permissive torsional beams 324a and 324b connect directly to transducer-carrying platforms 325a and 325b.

FIG. 24 illustrates the point that gimbaling conductor configurations may employ torsional beams which are obliquely angled relative to lengthwise axis AX of the flexure. In gimbaling conductor configuration 330, the axes of external torsional beams 332a and 332b, and internal torsional beams 334a and 334b are each obliquely angled relative to axis AX. The FIG. 24 configuration also illustrates the point that the torsional axes of torsional beam pairs, i.e., 332a and 332b versus 334a and 334b, do not need to be perpendicular to each other. These beams perform as mixed-mode articulators, with both hinging and torsional action.

In FIG. 25, the gimbaling conductor configuration is similar to the FIG. 14 configuration, except for the addition of longitudinal stiffening arms 342a and 342b, each of which may be described as a simply supported cantilever with applied moment. Ideally, arms 342a and 342b should connect with 344a and 344b, respectively, as close to the center of the gimbal as possible.

Figure 26:
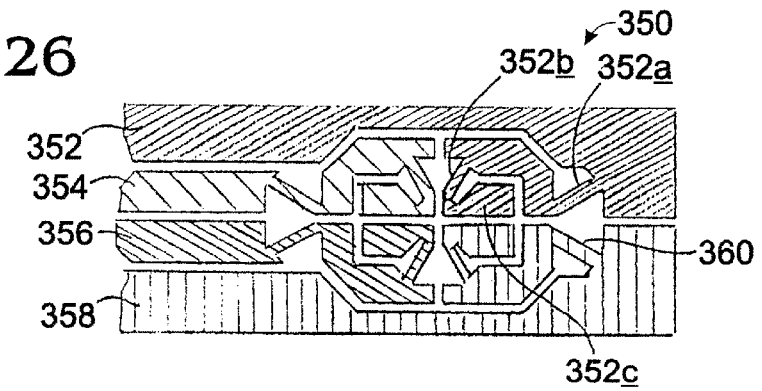
FIG. 26 is a top view of a modified four-conductor gimbaling structure.

All of the gimbaling conductor configurations mentioned so far, embody a single pair of conductors. In contrast, FIG. 26 illustrates a gimbaling conductor configuration with four conductors 352, 354, 356 and 358. These form conductors are differently shaded in order to illustrate and clarify their respective paths from the flexure body into and through the gimbal. Each of conductors 352, 354, 356 and 358 contributes two torsional beams and one quadrant of a transducer-carrying platform. For example, conductor 352 runs through torsional beam 352a, then through torsional beam 352b and ends in transducer-carrying platform quadrant 352c. Each of the other conductors follows a similar complementary path.

FIG. 26 also illustrates that the four right-angle torsional beams shown in the FIG. 14 configuration can be replaced with four pairs of beams, wherein each pair includes two oblique beams. Each pair of oblique beams, for example, the pair including beams 360 and 352a, is referred to as a "triangular, dual-beam torsional articulator". The triangular dual-beam torsional articulator provides greater stiffness in comparison to the single right-angle beam systems previously described. It is also possible to produce a gimbaling conductor configuration in which torsional beams 360 and 352a are parallel to each other.

The gimbaling conductor structure shown in FIG. 27A is fundamentally different from the previously described gimbals because, here, gimbaling movement is facilitated by hinges instead of by torsional beams. In FIG. 27A, flexure 380 includes conductors 382 and 384. Moving toward the distal ends of conductors 382 and 384, roll-permissive gimbal regions 386 and 388 are defined. Nearer the distal ends, pitch-permissive hinge regions 390 and 392 are defined. FIG. 27B illustrates the distal end region of flexure 395 which includes the gimbaling conductor structure 380 of FIG. 27A, with the addition of top stiffening layers 394, 396 and 398. Stiffeners 394, 396 and 398 stiffen all areas of the conductors except for isolated hinge regions 386, 388, 390 and 392.

This hinging gimbal configuration provides several important advantages. First, it can be made smaller (less width required) compared to the gimbal configurations which employ torsional beams, and this allows more of the disk surface, at the inner diameter, to be used for recording data since less pole-to-hub clearance is required. Second, a considerable amount of design flexibility is achieved with roll-permissive hinges 386 and 388 which can be positioned practically anywhere along the length of the flexure.

FIGS. 28A–30 illustrate another type of flexure which includes what may be thought of as a gimbal, but which differs from previous embodiments principally in that roll flexibility is achieved by the flexure body itself (i.e., by a "torsionally compliant beam") rather than by torsional beams or hinges, as in previously described gimbals. Three torsionally compliant beams are illustrated. In FIGS. 28A and 28B, a torsionally compliant beam without a pitch gimbaling mechanism, is illustrated. In FIGS. 29A and 29B, a torsionally compliant beam is equipped with pitch-permissive torsional beams in the distal end of the flexure. In FIG. 30, a torsionally compliant beam with pitch-permissive hinges, is shown.

The first torsionally compliant beam, or flexure, described is shown in FIGS. 28A and 28B. Torsionally compliant flexure 400, from top view, includes three principal portions, namely, base portion 401, neck portion (also referred to as a "torsional compliance portion") 402 and head portion 403. In a preferred embodiment, base portion 401 has a width W1 of 60-mils. Neck portion 402 has a width W2 of 20-mils. Head portion 403 has a width W3 of 40-mils. Conductors 404a and 404b (dashed lines in FIG. 28A) are adhesively bonded to overlying stiffeners 405a and 405b. A hinge region 406 is defined by internal edges of stiffeners of 405a and 405b. Three contact pads 407a, 407b and 407c are linearly arranged along the trailing edge of transducer chip 408 which is bonded via solder structures 409a and 409b to the bottom sides of conductors 404a and 404b. Centrally located contact pad 407b contains the transducer pole. Only two of the three pads are necessary for the flexure to exhibit torsional compliance. For example, the central pad could be eliminated and the pole could be located in either one of the pads 407a and 407c. If the pole is located in one of the off-center pads, it is preferable for the pole to be located in the outside pad, i.e., the side of the chip which is closest to the outer perimeter of the disk, in order to maximize the amount of usable space on the disk. Alternatively, a pole can be located in each of the contact pads 407a and 407c. The two poles can be used alternately or selectively depending upon the particular situation. Flexure/transducer 400 is shown with two conductors. However, it is apparent that a similar torsionally compliant flexure design employing four or more conductors can be easily designed and fabricated.

A torsionally compliant beam must include the following interrelated features: (1) the neck portion of the beam must be sufficiently torsionally soft to permit a desired range of roll movement of the head portion while maintaining sufficient lateral rigidity; (2) there must be at least two laterally-spaced contact pad points underneath the head portion of the flexure; (3) there must be sufficient load applied to the head portion so that a line of interfacial contact between the contact pad points and the surface of the disk is maintained despite external irregularities or aberrations which cause torsional flexing of the neck portion of the beam; and (4) the beam must exhibit sufficient lateral (anti-yaw) stability. Generally, as the distance between the laterally spaced contact points increases, less load is required in order to permit a desired degree of roll movement. Preferably, a torsionally compliant beam is sufficiently soft to permit plus or minus about 0.2° of roll under a total contact load of 300-mg. or less.

Note that flexure 400 is a gimbaling beam only in the sense that it permits roll motion of the transducer chip. Flexure 400 does not include any pitch gimbaling mechanism. The torsionally compliant beams illustrated in FIGS. 29A–30 are similar to flexure 400, except they additionally include pitch gimbaling mechanisms.

The second torsionally compliant beam illustrated is shown in FIGS. 29A and 29B. Flexure 410 includes load-bearing conductors 412 and 414 which are separated from each other and extend the entire length of the flexure body. Importantly, the distal ends of conductors 412 and 414 are configured cooperatively to provide pitch gimbaling. Parallel distal central regions 418a and 418b of conductors 412 and 414 form, collectively, a platform 418 for mounting transducer chip 419. Stiffeners 420, 422 and 424 are laminated by adhesive (not shown), to the top sides of conductors 412 and 414. Stiffener 424, laminated to the top side of platform 418, leaves exposed torsional beams 430a and 430b which allow a selected range of pitch gimbaling of transducer chip 419. A triangular configuration of pads is employed on the working side of transducer chip 419. One pad is located near the center of the trailing edge of chip 419. The other two pads are located at opposite rear corners of the leading edge of the chip. Similar to previously described gimbal designs, the three pad configuration defines an interfacial contact plane between the transducer chip and the surface of the recording medium.

Importantly, for a given selected material, intermediate neck portion 432 of flexure 410 is dimensioned (width, length and thickness) relative to the distance between laterally spaced contact pads on the bottom side of transducer chip 419, and the amount of load applied to chip 419, so that the neck portion is sufficiently torsionally soft to allow a desired range of roll movement of the transducer-carrying platform, while maintaining the plane of interfacial contact between the contact pads and the disk surface so that a desired range of torsional flexibility (typically 0.2° to 2.0°) for the transducer-carrying platform is permitted. Ideally, the beam is sufficiently torsionally soft to allow the transducer chip to roll approximately plus or minus one degree from applied moment due to the load. For example, flexure 410 has the following specifications: the load is approximately 300- to 350-milligrams; the width of the neck portion 432 of the beam is approximately 20-mils.; the length of the beam from proximal hinge to its distal tip is approximately 350-mils.; and the transducer chip 419 is 40-mils. by 40-mils.

The flexure 440, shown in FIG. 30, is essentially the same as torsionally compliant beam 410, except that a pitch gimbaling movement is permitted by hinges 442 and 444 instead of by torsional beams.

Figure 31:
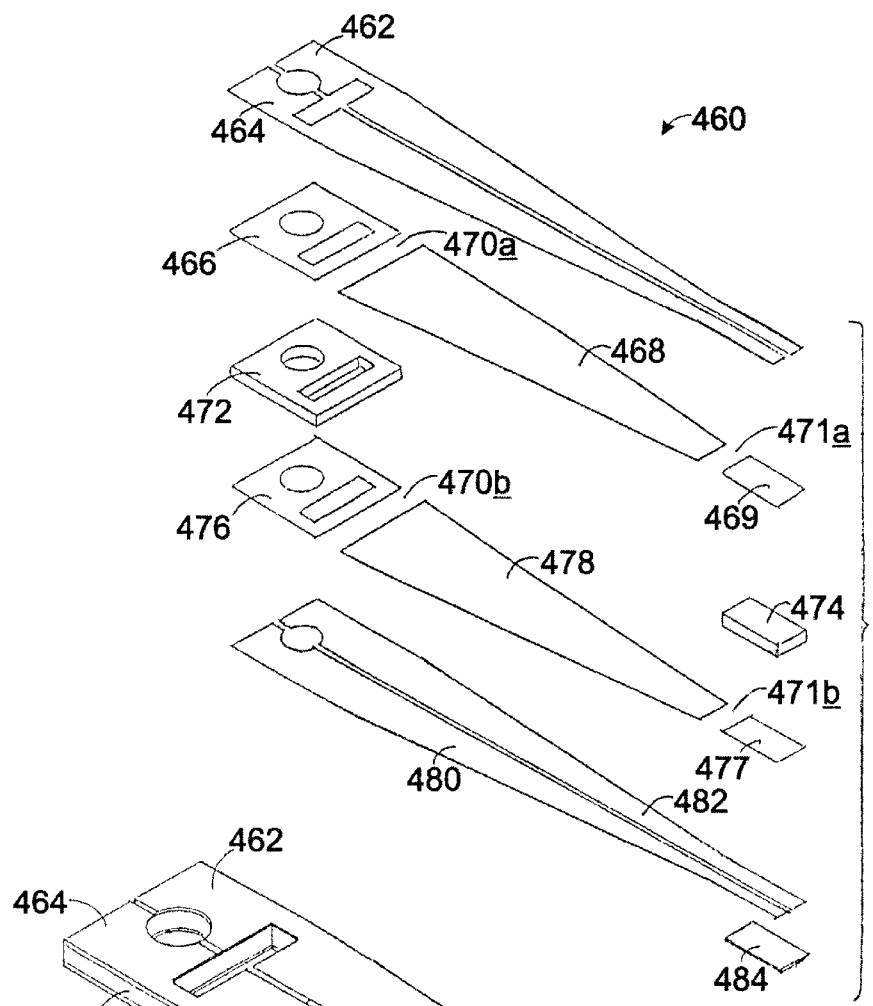
FIG. 31 is an exploded perspective view of a dual-cantilever transducer/flexure with four conductors and four hinges.
Figure 32:
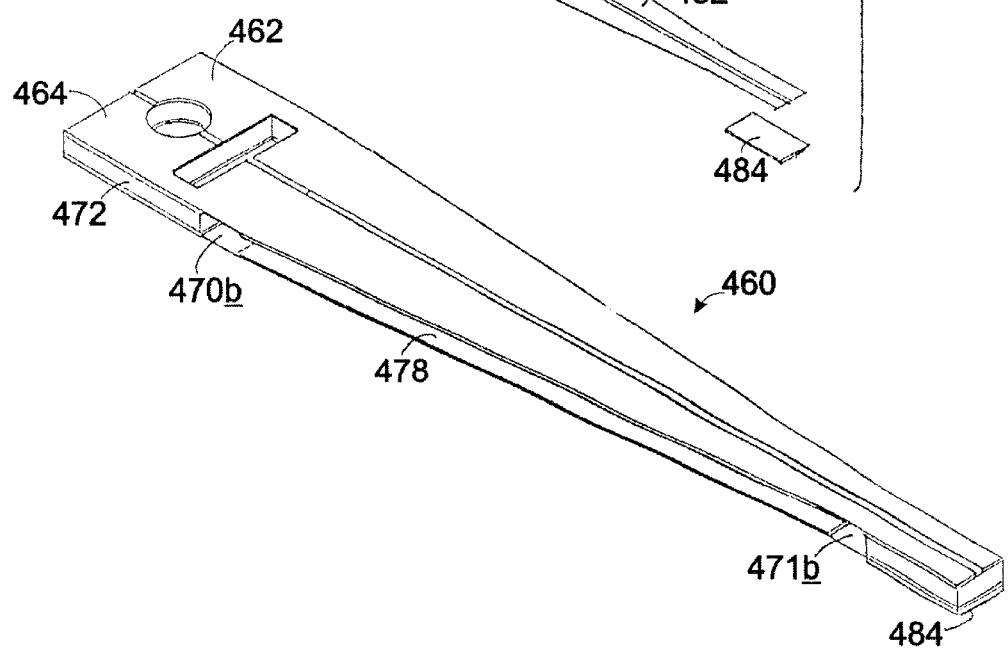
FIG. 32 is a perspective view of the transducer/flexure shown in FIG. 31, assembled.

FIGS. 31–34C illustrate another set of embodiments of the invention, referred to as "dual-cantilever" flexures. In these embodiments, also referred to as disk read/write structures, beams are stacked and spaced from each other by spacers located at each end. The overall dual-cantilever configuration may be referred to as a "parallelogram articulation substructure". Analogous to a "four-bar linkage", the flexure can be flexed without significantly altering the angular relationship between the transducer mounted on the distal end and the surface of a recording medium. Dual-cantilever flexure 460, as illustrated in FIG. 31, has two sets of conductors and four hinges. However, the dual-cantilever concept could also be implemented in a flexure with one pair of conductors and/or no hinges. Flexure 460 includes a top layer of side-by-side spaced conductors 462 and 464 which are laminated by adhesive, as previously described, to stiffeners 466, 468 and 469, with gaps 470a and 471a defining proximal and distal hinge regions, respectively. Stiffeners 466 and 469 are mounted on top of spacers 472 and 474, which in turn are mounted on top of stiffeners 476 and 477 on opposite sides of stiffener 478. Stiffener 476 is separated from stiffener 478 by a gap 470b which defines a second proximal hinge region in addition to 470a. Similarly, stiffener 478 and 477 are separated by a gap 471b which defines a second distal hinge region in addition to 471a. Stiffeners 476, 477 and 478 are laminated on top of conductors 480 and 482. The distal ends of conductors 480 and 482 support and are mounted on top of transducer chip 484. FIG. 32 shows a perspective view of flexure 460, assembled.

FIG. 33 shows the unloaded U (solid lines) and loaded L (dash-dot lines) positions of flexure 460 relative to disk 490. Note that flexure 460 is pre-bent in its unloaded position, with most (ideally all) of the bending occurring in hinge regions 470 and 471. A notable feature of the dual-cantilever design is that equal and opposite bending occurs toward opposite ends of the flexure. Accordingly, as shown in FIG. 33, pre-bends in proximal hinge regions 470a and 470b are oppositely matched by pre-bends in distal hinge regions 471a and 471b, respectively, so that transducer chip 484 maintains a parallel relationship with disk 490 as it moves from its unloaded to its loaded position. As shown in FIG. 33, by pre-bending a dual-cantilever flexure, an extremely close spacing between flexure mount 491 and disk 490 is permitted.

Figure 34C:
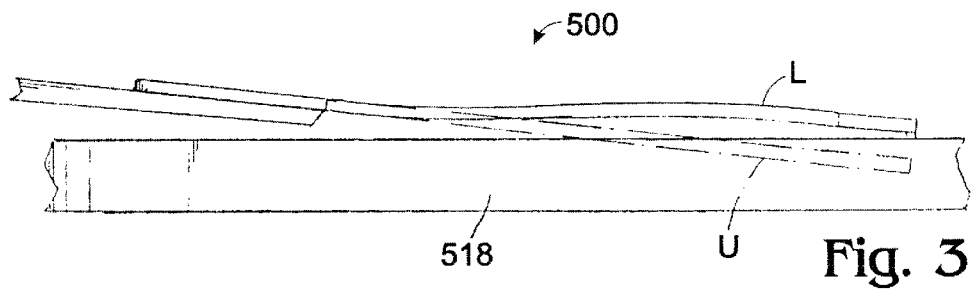
FIG. 34C is a schematic side view of the transducer/flexure shown in FIGS. 34A and 34B, in its unloaded position (dash-dot lines) and operating position (solid lines).

FIGS. 34A–34C illustrate a modified dual-cantilever flexure which does not have any stiffeners, hinges or pre-bends. Thus, it is apparent that the dual-cantilever concept can be practiced beneficially in an unhinged (and non-pre-bent) flexure because one of the main reasons to use a proximal hinge, i.e., minimization of the angular constant of the distal end, is substantially achieved by the dual-cantilever linkage itself. In FIG. 34A, flexure 500 includes top layer conductors 502 and 504 mounted on top of spacers 506 and 508, on top of conductors 510 and 512. It is necessary to provide electrical connection from the top layer conductors, for example, 502 and 504, to transducer 514 which is mounted on the bottom side of the distal ends of conductors 510 and 512. FIG. 34B shows a perspective view of flexure 500, assembled.

FIG. 34C shows a side view of flexure 500 in its unloaded U (dash-dot lines) and loaded L (solid lines) positions, relative to disk 518.

Figure 35:
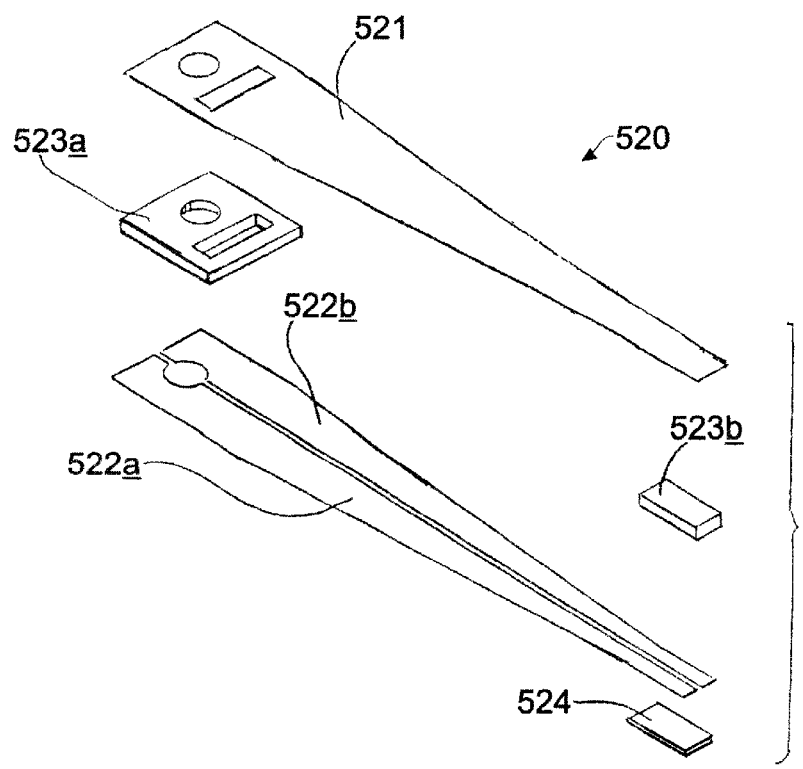
FIG. 35 is an exploded perspective view of another transducer/flexure embodiment.

The dual-cantilever concept can also be embodied in flexure designs with more or less than four conductors. It is also possible to isolate all of the conductors in either of the top and bottom layers. It is sometimes preferable to isolate all of the conductors in the bottom layer because the distal ends of the bottom layer conductors are in better position for electrical connection to the transducer chip. For example, FIG. 35 shows a dual-cantilever transducer/flexure 520 including top beam member 521 spaced from conductors 522a and 522b by spacers 523a and 523b located near the proximal and distal ends of the flexure, respectively. Transducer chip 524 is mounted on the bottom sides of the distal ends of conductors 522a and 522b.

Figure 36B:
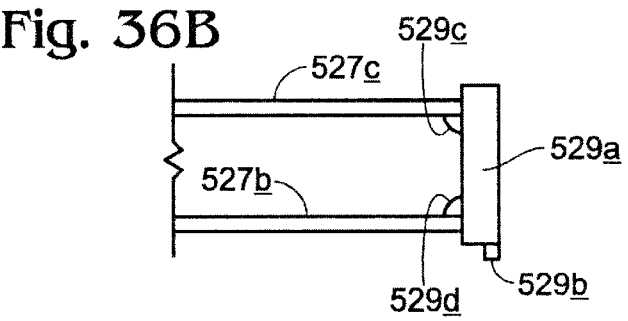
FIG. 36B is a partial side view of the distal end of the transducer/flexure shown in FIG. 36A.
Figure 36A:
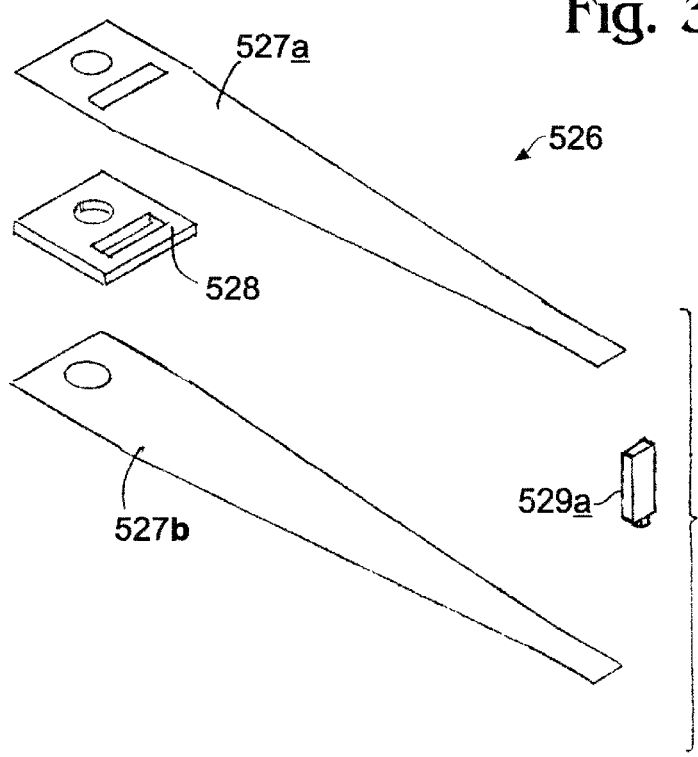
FIG. 36A is an exploded perspective view of still another dual-cantilever transducer/flexure embodiment.

Still another dual-cantilever embodiment 526, as shown in FIG. 36A, includes two conductors 527a and 527b, each conductor extending continuously over either the top or bottom layer of flexure 526. Near the proximal end of the beam, conductors 527a and 527b are separated by spacer 528. A transducer chip 529a is mounted to the distal end of the beam in an "on-end" or vertical orientation. As shown in FIG. 36B, chip 529a is bound to conductors 527a and 527b by conductive epoxy bonds 529c and 529d, thus eliminating the need for an additional spacer at the distal end of the beam. Transducer chip 529 is mounted on the bottom side of the distal end of conductor 527b.

Figure 37A:
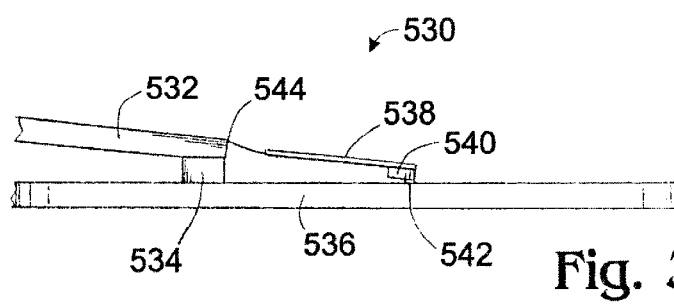
FIG. 37A is a schematic side view of a disk-contacting mount configuration supporting a transducer/flexure in its operating position.

FIG. 37A illustrates a flexure mounting device which contacts and follows the surface of the disk, thereby eliminating the need for a pitch gimbal in the flexure. The device includes mount arm 532 attached to pad 534 which contacts and follows the surface of relatively moving disk 536. Flexure 538 is attached to mount arm 532, and supports, at its distal end, transducer chip 540 which contacts the surface of disk 536 via contact pad 542. Assuming spacer pad 534 maintains contact with disk 536, the height point 544 where the proximal end of flexure 538 is mounted, is maintained constant. By mounting flexure 538 on a mounting device which follows the contours of the disk, the need for pitch gimbaling is eliminated.

The transducer/flexure designs illustrated in FIGS. 37B and 37C relate to the mounting structure shown in FIG. 37A in the sense that contact pads are located on separate structures which are allowed a range of articulation movement with respect to each other. Generally, this important feature of the invention makes possible gimbal designs in which the contact pads are spread out further from each other—resulting in greater surface accommodating stability. This is a contrast to the pad configurations previously described in which the distance between the pads has been generally limited by the size of the transducer chip.

In FIG. 37B, transducer/flexure 545, near its distal end 546a, has a hole 546b for mounting, and a bonding window 546c. A proximal hinge region 546d exposes conductors 546e and 546f which are also exposed through bonding window 546c. Moving toward the distal end of transducer/flexure 545, in an intermediate region, stiffeners 546g and 546h are laminated on top of conductors 546d and 546f, respectively. Conductors 546e and 546f are again exposed in a second hinge region defined by spaces between stiffeners 546g, 546h and stiffener 546k. On the bottom side of the flexure portion stiffened by stiffener 546k, contact pads 546l and 546m are positioned near opposite lateral edges of the portion. Conductors 546e and 546f are again exposed in a third hinge region defined by a space between stiffener 546k and stiffener 546p. Underneath and toward the distal end of stiffener 546p, transducer 546q is mounted. A contact pad 546r is located on the bottom side of transducer 546q, near its trailing edge. Transducer/flexure 545 can be viewed as being made up of plural, articulated beam portions.

In transducer/flexure 545, the conductors in the second hinge region and laterally spaced contact pads 546l and 546m, collectively provide for gimbaling movement of the transducer chip independent from the proximal end region of the flexure body. Pitch movement of transducer chip 546q is made possible by the conductor hinges in the third hinge region between the laterally spaced contact pads and the centrally located pad at the distal tip of the transducer chip.

The transducer/flexure shown in FIG. 37C is similar to the one shown in FIG. 37B. Transducer/flexure 547, near its proximal end 548a, has a hole 548b for mounting alignment, and bonding windows 548c and 548d. Conductors 548e, 548f, 548b and 548h are exposed in bonding windows 548c and 548d, respectively, and in a first hinge region 549a. Moving distally along the flexure, stiffener 548i is laminated on top of conductors 548e and 548f, and stiffener 548i is laminated on top of conductors 548g and 548h. The conductors are again exposed in a second hinge region 549b which is defined by the spaces between stiffeners 548i, 548j and stiffener 548k. On the bottom side of the flexure region stiffened by stiffener 548k, are laterally spaced contact pads 548l and 548m (shown in dashed lines). Continuing to move toward the distal end of the flexure, the conductors are again exposed in a third hinge region 549c, defined by the space between stiffener 548k and 548n. At the distal end of the flexure, transducer chip 548o (shown in dashed lines) is mounted on the bottom side of the flexure. A pole containing contact pad 548l (shown in dashed lines) is located on the bottom side of transducer chip 548o.

Each of the embodiments shown in FIGS. 37A–37C, illustrates important modification options relating to contact pad configurations. First, these embodiments (FIGS. 37A–37C) show that the contact pads do not have to be formed on the chip itself, as they are in the previously described transducer/flexure designs. Second, it is possible to position one or more of the contact pads on beam portions of the flexure which articulate independently from the flexure portion on which the transducer is mounted. For example, in a gimbal such as the one shown in FIGS. 13–15C, the laterally-spaced contact pads on the leading edge of chip 210 could be replaced on the bottom side of the roll frame stiffened by stiffener 220. These principles make it possible to increase greatly the longitudinal and lateral distances between the pads within constraints due to size and disk waviness. As already noted, increasing the distances between the pads improves the operable stability of the flexure. Increase in the distance between the pads also makes it possible for the gimbal to perform under a lighter load. Minimizing the load, in turn, is important for the purpose of minimizing wear, reducing friction, and lowering the probability of head and/or disk crash events.

FIGS. 38A–38C illustrate two flexure mounting systems. The mounting system illustrated in FIGS. 38B and 38C employ a dual-cantilever structure resulting in closer disk-to-disk spacing in comparison to previous flexure mounting systems, such as the one illustrated in FIG. 38A. The flexure mounting system 550, shown in FIG. 38A, includes E block 552 supporting flexure mounts 554a, 554b, 554c and 554d, which in turn hold flexures 556a, 556b, 556c and 556d, respectively. The flexures are supported in contacting relationship with opposing surfaces of disks 558a and 558b. Because of the relatively rigid relationship between E block 552 and mounts 554a–554d, in order to accommodate mounting and operating tolerances, a relative large spacing distance 560 must be maintained between the disks. In contrast, the flexure mounting system 570, as shown in FIG. 38B, permits significantly closer disk-to-disk spacing, by using a dual-cantilever in the mounting structure. In flexure mounting system 570, E block 572 supports dual-cantilever mounting structure 574 which has an elongate distal end 576 connected to flexure 578, which end supports transducer chip 580 in contact with the surface of disk 582. Each of the other flexures in the system shown in FIG. 38B, is similarly mounted. Dual-cantilever structure 574 allows relative movement between E block 572 and disk 582, while maintaining a parallel relationship between its elongate distal end 576 and the surface of disk 582. Accordingly, requisite disk-to-disk spacing 584 is greatly reduced relative to disk-to-disk space 560 in the prior system illustrated in FIG. 38A.

FIG. 38C is a magnified view of a single flexure mounting device from FIG. 38B. The elongate distal end 576 of dual-cantilever structure 574 supports pad 586 in a contacting relationship with the surface of disk 582. The proximal end of flexure 578 is attached to dual-cantilever structure distal end 576. By employing dual-cantilever structure 574 and disk-contacting pad 586, dual-cantilever distal end 576 is maintained in a parallel relationship to the surface of disk 582, and at a constant height above the disk. In addition to allowing closer disk-to-disk spacing, the design shown in FIG. 38C also substantially eliminates the need for pitch gimbaling analogous to the system illustrated in FIG. 37A.

Another aspect of the present invention relates to the goal of simplifying the process of mounting a flexure on an E block, and more specifically, providing an easy way of connecting the flexure electrically to a flex cable. FIGS. 39A–39C illustrate a flexure mounting structure which is versatile in the sense that it can be easily electrically connected to a mother flex cable in either an upside or a downside orientation. Nut-plate/flexure structure 587a, as shown in FIG. 39A, includes a flexure 588a which may take the form of any of the flexures previously described in this application, except for its different conductor structure. Nut-plate 588b is welded by spots 588c to a stiffener layer which is laminated on top of conductors 589a and 589b toward the proximal end of flexure 588a. Conductors 589a and 589b run from the transducer chip through the flexure where conductor 589a passes through the center region of the flexure and conductor 589b extends along both sides of the intermediate portion of flexure 588a. Conductor 589b then passes under nut-plate, 588b, and eventually extends in opposite lateral directions along paths leading to laterally opposite, proximally located tabs 588aa and 588bb. Similarly, centrally extending conductor 589a extends under nut-plate 588b and eventually splits into separate laterally opposite directions on paths which end in tabs 588aa and 588bb. On tab 588aa conductors 589a and 589b are exposed on the bottom side, and therefore are not visible in the view shown (dashed lines). Conversely, conductors 589a and 589b are exposed on the top side of tab 588bb. Thus, if nut-plate/flexure 587a is mounted under an E block arm, electrical connection to the flex cable is accomplished by bending tab 588bb up so that the conductors contact the flex cable conductors. Alternatively, if nut-plate/flexure 587a is mounted on top of an E block arm, electrical connection is accomplished by bending tab 588aa down so that conductors 589a and 589b contact the conductors in the flex cable. FIG. 39B shows four nut-plate/flexures, each one configured as shown in FIG. 39A, mounted on an E block. Nut-plate/flexure 587a is electrically connected to a flex cable 588d via conductor contact tab 589bb. Nut-plate/flexure 587b is electrically connected to flex cable 588d through conductor contact tab 589cc. Nut-plate/flexure 587c is electrically connected to flex cable 588d through conductor contact tab 589dd. Nut-plate/flexure 587d is electrically connected to flex cable 588d through conductor contact tab 589ee.

FIG. 39C shows a modified conductor configuration that results in lateral tabs which facilitate easy upside/downside electrical connection to a flex cable. Nut-plate/flexure 588e includes conductors 589i and 589j which extend from a gimbaled transducer mounted near the distal end of the flexure, through the flexure body, under the nut-plate, into semi-circular conductor contact tab 589ff, then to conductor contact pad 589gg. On tab 589ff, conductors 589i and 589j are upwardly exposed. On pad 589gg, conductors 589i and 589j are downwardly exposed, and therefore not visible in the view shown (dashed lines).

The flexures previously described are generally designed to operate under a load in the range of 30- to 300-, and preferably 35- to 70-milligrams. It is important to minimize the load exerted on the flexure during operation in order to minimize the rates of head and disk wear and to lower frictional power consumption. However, for those flexures which include a gimbal, it is necessary to apply a load which is great enough to maintain contact between the transducer chip contact pads and the disk surface, through the desired ranges of pitch and roll movement. It is generally possible to upsize and downsize the flexure designs described in this application, for use under different applied loads. For example, the load which is required for adequate gimbaling of a given flexure design, can be decreased by lengthening and/or thinning the dimensions of gimbal articulator structures, i.e., hinges or torsional beams.

FIGS. 40A–40C illustrate a flexure which is designed to operate under a load of approximately 35- to 70-milligrams. Beginning near the proximal end of flexure 590, a hole 591a is provided for mounting alignment. A window 591b exposes conductors 592a and 592b for electrical bonding. Within proximal hinge region 591c, conductors 592a and 592b are again visible. The primary structural components of hinge region 591c are stiffener straps 591d and 591e which are integral parts of stiffener 591f. Approaching the distal end of flexure 590, distal hinge region 591g is made up of lateral edge portions of conductors 592a and 592b. A gimbal 591h is provided near the distal end of flexure 590 for mounting a transducer and for facilitating movement of the transducer independent from the main body of flexure 590. Three separate stiffeners 591i, 591j and 591k define gimbal articulators which are shown in more detail in FIGS. 40B and 40C. Dimensions of flexure 590 are as follows:

AA=0.060-inches
BB=0.455-inches
CC=0.030-inches
DD=0.010-inches
EE=0.350-inches
FF=0.080-inches FIG. 40B illustrates an isolated top view of the conductors 592a and 592h. The conductors are separately shaded in order to emphasize their separate paths. Stiffening layers 592c and 592d are co-planar with conductors 592a and 592b, but are separate from the conductors so they do not function as conductors in flexure 590. Conductor 592a extends to the distal tip of flexure 590, then passes toward the transducer chip through torsional beam 592e, then through hinge 592f, finally ending in a transducer mounting platform 592g. Similarly, conductor 592b passes through torsional beam 592h, then through hinge 592i, and ends in a transducer mounting platform 592j.

FIG. 40C shows a magnified view of the assembled gimbal in flexure 590. As previously described, stiffeners 591i, 591j and 591k expose and define gimbal articulators, namely, roll-permissive torsional beams 592e and 592h, and pitch-permissive hinges 592f and 592i. Shock-resistant tabs 594a, 594b, 594c and 594d extend across the gap between stiffeners 591i and 591k. These tabs limit the distance or extent to which the transducer-carrying central region of the gimbal can move upward along the Z axis out of the plane containing the roll structure stiffened by stiffener 591j. Similarly, tabs 595a, 595b, 595c and 595d extend across the gap between stiffeners 591i and 591j, thereby limiting the extent to which the roll frame can move upward along the Z axis above the plane containing the main body of the flexure. The primary purpose of the tabs is to limit the movement of gimbal parts in a high-shock situation.

Miniature reservoirs for containing dampening material in and around the gimbal region are also defined. Each reservoir is typically formed by making semi-circular cuts on opposite edges of stiffeners near a gap between gimbal parts. For example, an outer organization of reservoirs 597a, 597b, 597c and 597d facilitate deposition of a damping material through a syringe, for example, damping material 598 in reservoir 597a, creating a bridge across the gap between stiffener 591i and 591j. Two more damping material reservoirs 599a and 599b are located across gaps between stiffeners 591j and 591k on opposite sides of stiffener 591k. Hole 599c in the center of stiffener 591k is provided to permit application of adhesive for the purpose of bonding the chip to the suspension. Preferred dimensions in the gimbal region are as follows:

GG=0.028-inches
HH=0.007-inches
II=0.024-inches
JJ=0.002-inches
KK=0.020-inches
LL=0.040-inches
MM=0.002-inches
NN=0.002-inches
OO=0.002-inches conductor thickness=0.004-inches stiffener thickness=0.0008-inches It should be noted with respect to flexure 590, as well as all of the other flexures previously described in which a hinge is located near the distal end of the flexure, that it is sometimes preferred to replace the hinge with a pre-bend. Such a bend is in the range of approximately 1°–4° around an axis parallel to the X axis (rotation of the distal end of the flexure upward out of the plane containing the flexure body). Fabricating a bend near the distal tip of the flexure is an extra manufacturing step in comparison to a process for manufacturing a flat flexure with a proximal hinge. However, a proximal bend is sometimes preferred over a proximal hinge because it improves vibrational stability and is more robust to shock. For example, FIG. 40D shows schematically a side view of flexure 599d which includes a main body portion 599e and a distal end portion 599f. The distal end portion 599f is slightly bent at point 599g with respect to main body portion 599e. Angle α, i.e., the degree of pre-bending is approximately 1°–4°.

METHOD OF PRODUCTION

Various combinations of machining and chemical etching steps may be used to construct flexures of the present invention.

EXAMPLE 1

Figure 41:
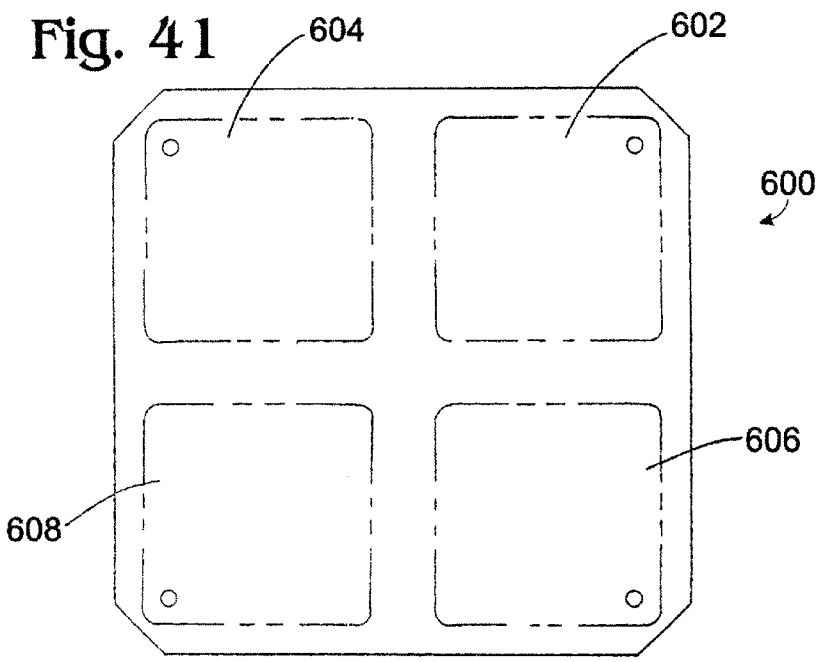

Multiple sets of flexure layers are cut out of single sheets. For example, FIG. 41 shows a sheet 600 with four quadrants 602, 604, 606 and 608. A set of laminated flexures is produced simultaneously in each quadrant. The following figures and description focus on only a single quadrant.

Figure 42:
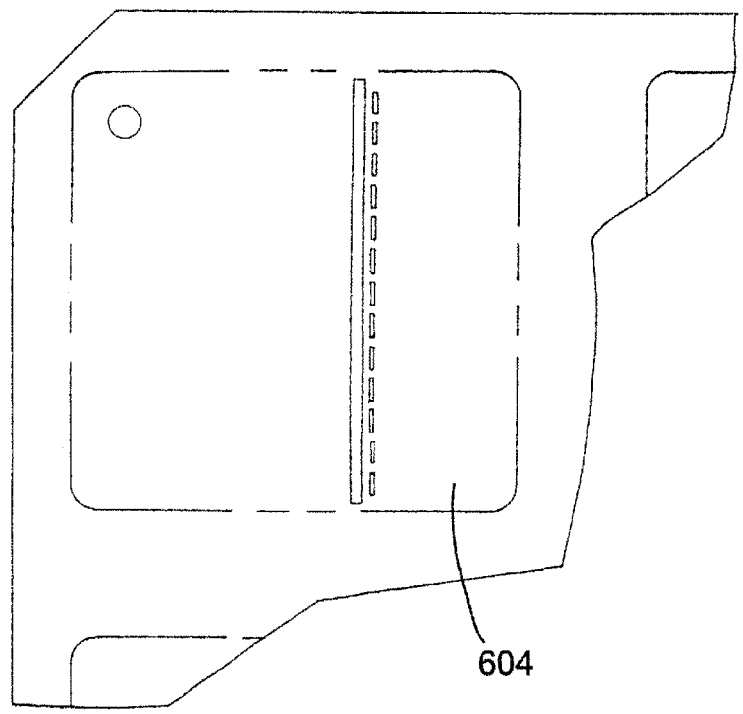

A 1-mil. layer of stainless steel is mechanically (laser) cut out in the pattern shown in FIG. 42. Cut-out section 610 defines the hinge, and cut-outs such as 612 form rectangular windows for wire bonding.

A second sheet of adhesive is cut with the same pattern as shown in FIG. 42. If the adhesive is attached to the 1-mil. stainless steel layer prior to cutting, both layers can be cut simultaneously.

Figure 43:
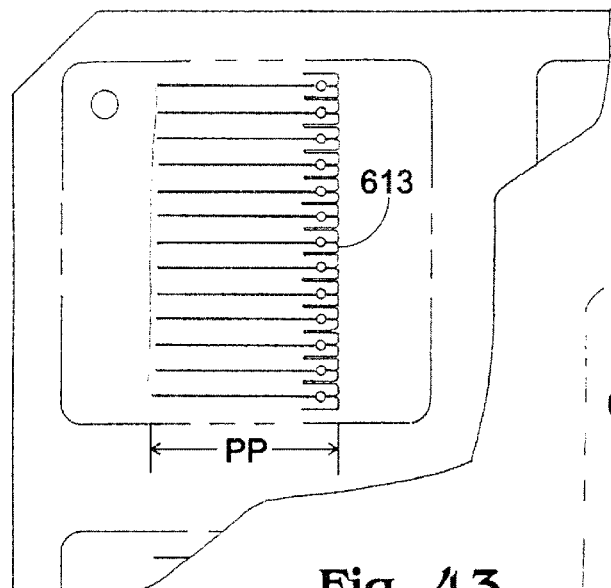

A conductive layer is mechanically cut out of a 0.5-mil. thick stainless steel sheet, according to the pattern 613 shown in FIG. 43, so that all conductors are electrically isolated after the final cut is made, as explained below. The material is then cleaned and gold plated on both sides of the sheet in region PP.

The alignment holes are then used to align the layers on tooling pins. The layers are pressed to specified loads and heated in an oven to promote curing of the adhesive.

Figure 44:
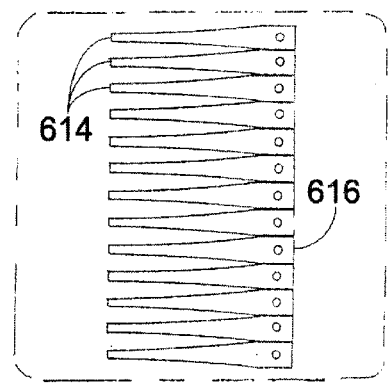

The laminant is cut with a laser to define the beam shape 614 as shown in FIG. 44. The cut either defines individual beams 614 or "combs" 616 of beams.

Figure 45:
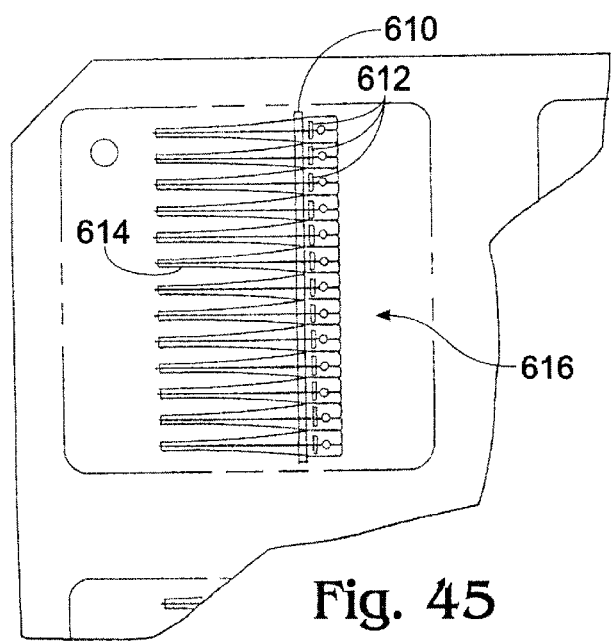

FIG. 45 shows a composite of all cuts.

FIG. 46 shows a final beam, essentially corresponding to the flexure illustrated in FIGS. 2 and 2B.

The flexure shown in FIG. 46 has the following dimensions:

A=40 mils.
B=20 mils.
C=350 mils.
D=390 mils.
E=430 mils.
F=24 mils.
G=10 mils.
H=12 mils.
I=21 mils.
J=44 mils.
K=60 mils.

EXAMPLE 2

The second manufacturing example employs chemical etching and/or laser cutting steps. Three sets of conductive layers are cut out from areas 330, 332 and 334 of one sheet 336, as shown in FIG. 47. The following description and drawings refer to the production of a single set of flexures from area 330. Alternatively, a continuous sheet of adhesive can be applied, then cut out by plasma etching after the conductor and stiffener layers are laminated.

A 0.5-mil. thick stainless steel conductor layer is patterned as shown in FIG. 48. Pattern 340 is cut out either by chemical etching or laser cutting. During the production process, conductor pairs remain attached to adjacent conductor pairs by tabs 342. A corresponding 1-mil. thick stainless steel stiffener layer is chemically etched or laser cut according to pattern 343 shown in FIG. 49. Adjacent stiffeners are held together by tabs 344 and 346. An adhesive layer is applied either by stamping or laser cutting.

A 0.5-mil. thick layer of gold is plated onto the conductors. The gold may be plated onto the entire conductor surface (preferred for stainless steel) or may be confined to the electrical bonding regions (preferred for beryllium copper).

The layers are aligned and bonded under temperature and pressure.

Finally, individual flexures are separated from each other by mechanically shearing or laser cutting tabs 342, 344 and 346.

Other methods of producing laminant suspensions such as the ones disclosed in U.S. Pat. Nos. 4,991,045 and 5,187,625 (both are incorporated here by reference) have been developed by Hutchinson Technology Inc. of Hutchinson, Minn. and are generally applicable to the flexures disclosed in this application.

EXAMPLE 3

The following technique is used to attach the transducer chip.

Solder paste is applied with a stencil to the chip or beam (conductors).

The beam and the chip are aligned and the solder is heated to its melting point either locally with hot air, laser or infrared heating, or placed in an oven.

EXAMPLE 4

Another method for attaching the transducer chip involves laser soldering. First, tin is deposited on gold bonding pads on the chip. Second, a laser is used to heat the gold and tin through small holes (example, holes 90 in FIGS. 2 and 3A) in the metal (stiffener) or by heating the metal directly. The tin and gold melt to form a eutectic bond.

EXAMPLE 5

The following process is used to attach a damper for the purpose of attenuating vibrations. Damping material can be applied either before or after patterning.

In a pre-patterning technique, damper (viscoelastic polymer on constraining layer) is stamped or cut with a laser to define the shape. Each damper is then aligned individually and then applied to each beam.

In a post-patterning process, a square of damping material with constraining layer is applied to the beam or comb without precise alignment. A laser is then used to trim the shape of the damping material to be slightly larger than the beam shape.

Example 6

The following techniques are used to lap a single pad on a chip, for example, 97 in FIGS. 3B and 3C.

First, the beams are made on a comb with relatively long fingers. The comb is placed in a "lapper/tester" machine which loads the beam onto a rough disk for lapping. Electrical connection is made through the metal in these fingers (an extension of the beam conductors).

The machine individually twists the comb fingers and uses the magnetic signal as a lapping stop indicator to achieve "roll" facets.

Pitch facets are achieved by changing the Z-height and thereby changing the angle at the beam tip.

Magnetic performance may also be tested in the process.

Example 7

The following technique is used for lapping a three-pad chip, such as the one employed in the gimbaling flexures described above. Since the gimbal compensates for static tolerances, only a flat lap is required to achieve full signal quickly in the drive. Therefore, a shorter, simpler comb may be used with a simpler lapping machine. This machine loads the beams to a given Z-height, exposing the pole and testing.

It is also possible to lap the chip pad prior to attaching the chip to the beam.

FIGS. 50A and 50B schematically illustrate modified forms of transducer chips. In contrast to the rectangular transducer chips previously described, the chips shown in FIGS. 50A and 50B have different shapes for the purposes of: (a) maximizing the lateral and longitudinal distances between contact pads; (b) minimizing the weight of the transducer chip; and (c) maximizing the efficient use of materials in the chip-making process. The T-shaped and triangle-shaped transducers, as shown in FIGS. 50A and 50B, respectively, are particularly useful chip designs where a tri-pad arrangement is formed on the bottom of the chip for use in a gimbaled, disk-contacting transducer/flexure. In FIG. 50A, T-shaped chip 400 has contact pads 402*a*, 402*b* and 402*c* arranged in a triangular configuration. Similarly, in FIG. 50B, triangular chip 410 has three contact pads 412*a* 412*b* and 412*c*, again arranged in a triangular configuration. The shapes and dimensions of the chip are also dictated by the particular coil structure which is typically embedded in the chip.

Although numerous embodiments of the invention have been described in detail above, it is apparent that many other modifications are enabled by the disclosure and encompassed in spirit and scope by the claims set forth below. For example, while most all of the embodiments specifically described above are transducer/flexures which are designed to operate in contact with the surface of a medium, it is apparent that many of the principles of the present invention have application to non-contacting or quasi-contacting transducer/flexures, such as "flying sliders". Flying sliders do not employ pads such as the ones described in this application, but instead employ rails or air-bearing pads. However, flying sliders frequently require gimbaling mechanisms, and face many similar mechanical accommodation challenges as do contacting transducer/flexures. The fact that most of the embodiments described in this application are shown with contacting pads, should not be viewed in any way as a limitation on the applicability of the present invention to non-contacting or quasi-contacting head/flexure systems.

Further, it is important to recall that many of the features of the present invention can be employed to great advantage with mediums other than rigid disks—for example, with drums, floppy disks, tape, etc.

We claim:

1. A disk-drive flexure/conductor structure comprising
   an elongate flexure body having a distal end including a plurality of conductors spaced from each other and extending along substantially the entire length of the body, and
   an electromagnetic transducer mounted on the distal end of the flexure body and held in dynamic contact with a recording surface of a magnetic recording medium amid read/write communication with said medium, and wherein each of said conductors has a thickness which is at least about 13% of the total thickness of the body so that the conductors function as load bearing beams at least partially supporting the transducer.

2. The disk-drive flexure/conductor structure of claim 1 wherein the thickness of the conductors are at least about 20% of the total thickness of the flexure body.

3. The disk-drive flexure/conductor structure of claim 1 wherein the flexure body has a proximal end opposite from the distal end, the flexure body having two lateral edges which taper inward from the proximal end toward the distal end so that the width of the flexure body near the distal end is less than the width of the flexure body near the proximal end.

4. The disk-drive flexure/conductor structure of claim 1 further comprising a gimbal mechanism connecting the flexure body to the transducer so that the transducer is permitted to move relative to the flexure body during read/write operation on a magnetic recording medium.

5. The disk-drive flexure/conductor structure of claim 1 wherein the flexure body has at least one location along its length where the conductors are the sole load-bearing beams in the flexure body.

6. The disk-drive flexure/conductor structure of claim 5 wherein said location along the length of the flexure body defines a hinge region for permitting controlled movement of the transducer along a Z-axis perpendicular to a recording medium surface.

7. The disk-drive flexure/conductor structure of claim 5 wherein said location is closer to the proximal end of the flexure body than it is to the distal end of the flexure body.

8. The disk-drive flexure/conductor structure of claim 1 wherein the flexure body includes at least one stiffening layer adhesively bonded to the conductors.

9. The disk-drive flexure/conductor structure of claim 6 wherein the flexure body includes stiffening layers adhesively joined to the conductors on opposite sides of the hinge region.

10. A device for storing and retrieving information on a spinning rigid disk comprising:
- a transducer composed of a plurality of adjoining solid films including a disk-facing projection, a conductive coil inductively coupled to a magnetically permeable core terminating in a pair of tips encased by said projection for concurrent contact and communication with the disk, and
- an elongated arm attached to said transducer, composed of a plurality of adjoining solid layers and having a length, a width and a thickness with said thickness being substantially less than said width and said width being substantially less than said length, said arm including a plurality of conductive ribbons extending lengthwise, separated widthwise and connected to said coil.

11. The device of claim 10 wherein at least one of said tips is exposed adjacent to the disk.

12. The device of claim 10 wherein said conductive ribbons are disposed on a disk-facing portion of said arm.

13. The device of claim 10 wherein said conductive ribbons are separated from other solid layers of said arm adjacent to said transducer.

* * * * *